United States Patent [19]
Konno

[11] Patent Number: 5,969,881
[45] Date of Patent: Oct. 19, 1999

[54] ZOOM LENS SYSTEM

[75] Inventor: Kenji Konno, Daito, Japan

[73] Assignee: Minolta Co., Ltd., Osaka, Japan

[21] Appl. No.: 08/978,310

[22] Filed: Nov. 25, 1997

[30]     Foreign Application Priority Data

Nov. 28, 1996   [JP]   Japan ................................. 8-318112
Nov. 28, 1996   [JP]   Japan ................................. 8-318127

[51] Int. Cl.⁶ ................................................ G02B 15/14
[52] U.S. Cl. ........................................ 359/691; 359/689
[58] Field of Search ............................ 359/554, 557, 359/689, 691

[56]             References Cited

U.S. PATENT DOCUMENTS 5,715,088   2/1998   Suzuki ................................ 359/557
5,774,267   6/1998   Kodama et al. ................... 359/557

FOREIGN PATENT DOCUMENTS 6-337374   12/1994   Japan .
7-64025    3/1995    Japan .

*Primary Examiner*—Georgia Epps
*Assistant Examiner*—David N. Spector
*Attorney, Agent, or Firm*—Sidley & Austin

[57]             ABSTRACT

A zoom lens system has, from the object side, a first lens unit and a second lens unit. The first lens unit has a negative optical power. The second lens unit has a positive optical power. The second lens unit includes front and rear lens units which each have a positive optical power. The front lens unit is shifted in a direction perpendicular to the optical axis to compensate for an image blurring. The zoom lens system fulfills the condition $0<\phi 2R/\phi 2F<1.0$, where $\phi 2R$ and $\phi 2F$ represent optical powers of the rear and front lens units, respectively.

14 Claims, 22 Drawing Sheets

FNO=4.10

(W)
— d
---- SC

-0.5   0.5
SPHERICAL SINE
ABERRATION CONDITION

Y'=17.3

---- DM
— DS

-0.5   0.5
ASTIGMATISM

Y'=17.3

-5.0   5.0
DISTORTION %

FNO=4.90

(M)
— d
---- SC

-0.5   0.5
SPHERICAL SINE
ABERRATION CONDITION

Y'=17.3

---- DM
— DS

-0.5   0.5
ASTIGMATISM

Y'=17.3

-5.0   5.0
DISTORTION %

FNO=5.80

(T)
— d
---- SC

-0.5   0.5
SPHERICAL SINE
ABERRATION CONDITION

Y'=17.3

---- DM
— DS

-0.5   0.5
ASTIGMATISM

Y'=17.3

-5.0   5.0
DISTORTION %

FNO=4.10
(W)

-0.5  0.5
SPHERICAL SINE
ABERRATION CONDITION

Y'=17.3

-0.5  0.5
ASTIGMATISM

Y'=17.3

-5.0  5.0
DISTORTION %

FNO=4.87
(M)

-0.5  0.5
SPHERICAL SINE
ABERRATION CONDITION

Y'=17.3

-0.5  0.5
ASTIGMATISM

Y'=17.3

-5.0  5.0
DISTORTION %

FNO=5.77
(T)

-0.5  0.5
SPHERICAL SINE
ABERRATION CONDITION

Y'=17.3

-0.5  0.5
ASTIGMATISM

Y'=17.3

-5.0  5.0
DISTORTION %

FNO=4.10

(W)
— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

FNO=4.87

(M)
— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

FNO=5.77

(T)
— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

FNO=4.10
(W)
— d
---- SC
-0.5  0.5
SPHERICAL  SINE
ABERRATION  CONDITION

Y'=17.3
---- DM
— DS
-0.5  0.5
ASTIGMATISM

Y'=17.3
-5.0  5.0
DISTORTION %

FNO=5.20
(M)
— d
---- SC
-0.5  0.5
SPHERICAL  SINE
ABERRATION  CONDITION

Y'=17.3
---- DM
— DS
-0.5  0.5
ASTIGMATISM

Y'=17.3
-5.0  5.0
DISTORTION %

FNO=5.78
(T)
— d
---- SC
-0.5  0.5
SPHERICAL  SINE
ABERRATION  CONDITION

Y'=17.3
---- DM
— DS
-0.5  0.5
ASTIGMATISM

Y'=17.3
-5.0  5.0
DISTORTION %

FNO=4.10

(W)
— d
---- SC

-0.5   0.5
SPHERICAL  SINE
ABERRATION CONDITION

Y'=17.3

---- DM
— DS

-0.5   0.5
ASTIGMATISM

Y'=17.3

-5.0   5.0
DISTORTION %

FNO=4.87

(M)
— d
---- SC

-0.5   0.5
SPHERICAL  SINE
ABERRATION CONDITION

Y'=17.3

---- DM
— DS

-0.5   0.5
ASTIGMATISM

Y'=17.3

-5.0   5.0
DISTORTION %

FNO=5.77

(T)
— d
---- SC

-0.5   0.5
SPHERICAL  SINE
ABERRATION CONDITION

Y'=17.3

---- DM
— DS

-0.5   0.5
ASTIGMATISM

Y'=17.3

-5.0   5.0
DISTORTION %

ZOOM LENS SYSTEM

FIELD OF THE INVENTION

The present invention relates to a zoom lens system having a camera shake compensation function, and more specifically, to a zoom lens system having a camera shake compensation function being suitable for lens-shutter cameras and capable of preventing image blurs due to camera shake (for example, vibration caused when photographing is performed with the camera being held by hand). In this specification, "camera shake" denotes general image blurs caused by vibration of the optical system.

BACKGROUND OF THE INVENTION

Conventionally, failures in photographing have resulted mostly from camera shake and out-of-focus state. In recent years, however, the automatic focusing mechanism has been employed in most cameras and as the focusing accuracy of the automatic focusing mechanism improves, the failure in photographing due to out-of-focus state has been virtually solved. On the other hand, lens systems which come standard on cameras have shifted from fixed focal length lens systems to zoom lens systems. As a result, at present, it is no exaggeration to say that failures in photographing are caused by camera shake. For this reason, a camera shake compensation function is indispensable to zoom lens systems.

To solve this problem, Japanese Laid-open Patent Application No. H6-337374 discloses a two-component zoom lens system of negative, positive configuration in which the whole of the second lens unit is parallelly decentered to compensate for camera shake. Japanese Laid-open Patent Application No. H7-64025 discloses a two-component zoom lens system of negative, positive configuration in which the second lens unit is divided into a front lens unit having a positive optical power and a rear lens unit having a negative optical power and the front lens unit having a positive optical power is parallelly decentered to compensate for camera shake.

However, in Japanese Laid-open Patent Application No. H6-337374, since the whole of the second lens unit is moved as a camera shake compensation unit, the load imposed on the camera shake compensation drive system is heavy. In Japanese Laid-open Patent Application No. H7-64025, since evaluation is performed with a camera shake angle of 0.2 degrees, camera shake cannot be completely compensated for when a greater camera shake occurs.

SUMMARY OF THE INVENTION

An object of the present invention is to provide a zoom lens system in which the load imposed on the camera shake compensation drive system is reduced by using a comparatively lightweight lens unit as the camera shake compensation unit so that excellent optical performance is obtained even when a great camera shake occurs.

To achieve the above object, according to one aspect of the present invention, a zoom lens system is provided with, from an object side, a first lens unit having a negative optical power and a second lens unit having a positive optical power, the second lens unit comprising, from the object side, a front lens unit having a positive optical power and a rear lens unit having a positive optical power, wherein the front lens unit is shifted along a direction perpendicular to the optical axis for compensating for an image blurring caused by vibrating the entire zoom lens system, and wherein the zoom lens system fulfills the condition $$0<\phi2R/\phi2F<1.0$$

where $\phi2F$ represents the optical power of the front lens unit, and $\phi2R$ represents the optical power of the rear lens unit.

According to another aspect of the present invention, a zoom lens device is provided with:

a zoom lens system having, from an object side, a first lens unit having a negative optical power; and a second lens unit having a positive optical power, the second lens unit comprising, from the object side, a front lens unit having a positive optical power and a rear lens unit having a positive optical power, the front lens unit being shiftable in a direction perpendicular to an optical axis for compensating an image blurring caused by vibrating the entire zoom lens system, wherein the front lens unit is shifted along a direction perpendicular to the optical axis for compensating for an image blurring caused by vibrating the entire zoom lens system, and wherein the zoom lens system fulfills the condition $$0<\phi2R/\phi2F<1.0$$

where $\phi2F$ represents the optical power of the front lens unit, and $\phi2R$ represents the optical power of the rear lens unit;

a detector which detects the vibration of the entire zoom lens system and outputs a detecting signal according to a result of the detection;

an actuator which moves the front lens unit in a direction perpendicular to the optical axis according to the driving signal input therein; and a controller which outputs a driving signal to the actuator based on the detecting signal from the detector.

According to still another aspect of the present invention, a zoom lens system is provided with, from an object side, a first lens unit having a negative optical power; and a second lens unit having a positive optical power, the second lens unit comprising, from the object side, a front lens unit having a positive optical power and a rear lens unit having a positive optical power, wherein the rear lens unit is shifted along a direction perpendicular to the optical axis for compensating for an image blurring caused by vibrating the entire zoom lens system, and wherein the zoom lens system fulfills the condition $$0<\phi2F/\phi2R<1.0$$

where $\phi2F$ represents the optical power of the front lens unit, and $\phi2R$ represents the optical power of the rear lens unit.

According to a further aspect of the present invention, a zoom lens device is provided with:

a zoom lens system having, from an object side, a first lens unit having a negative optical power; and a second lens unit having a positive optical power, the second lens unit comprising, from the object side, a front lens unit having a positive optical power and a rear lens unit having a positive optical power, the rear lens unit being shiftable in a direction perpendicular to an optical axis for compensating for an image blurring caused by vibrating the entire zoom lens system, wherein the rear lens unit is shifted along a direction perpendicular to the optical axis for compensating an image blurring caused by vibrating the entire zoom lens system, and wherein the zoom lens system fulfills the condition $$0<\phi2F/\phi2R<1.0$$

where $\phi2F$ represents the optical power of the front lens unit, and $\phi2R$ represents the optical power of the rear lens unit;

a detector which detects the vibration of the entire zoom lens system and outputs a detecting signal according to a result of the detection;

an actuator which moves the rear lens unit in a direction perpendicular to the optical axis according to the driving signal input therein; and a controller which outputs a driving signal to the actuator based on the detecting signal from the detector.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Zoom lens systems having a camera shake compensation function embodying the present invention will be hereinafter described with reference to the drawings. FIGS. 1, 2, 3, 13 and 14 showing the lens constructions of zoom lens systems according to first to fifth embodiments, respectively, show the lens arrangements at the shortest focal length condition (W). In the figures, the surfaces marked with ri (i=1, 2, 3, . . . ) represent ith surfaces counted from the object side and the axial distances marked with di (i=1, 2, 3, . . . ) are ith axial distances counted from the object side.

Figure 1:
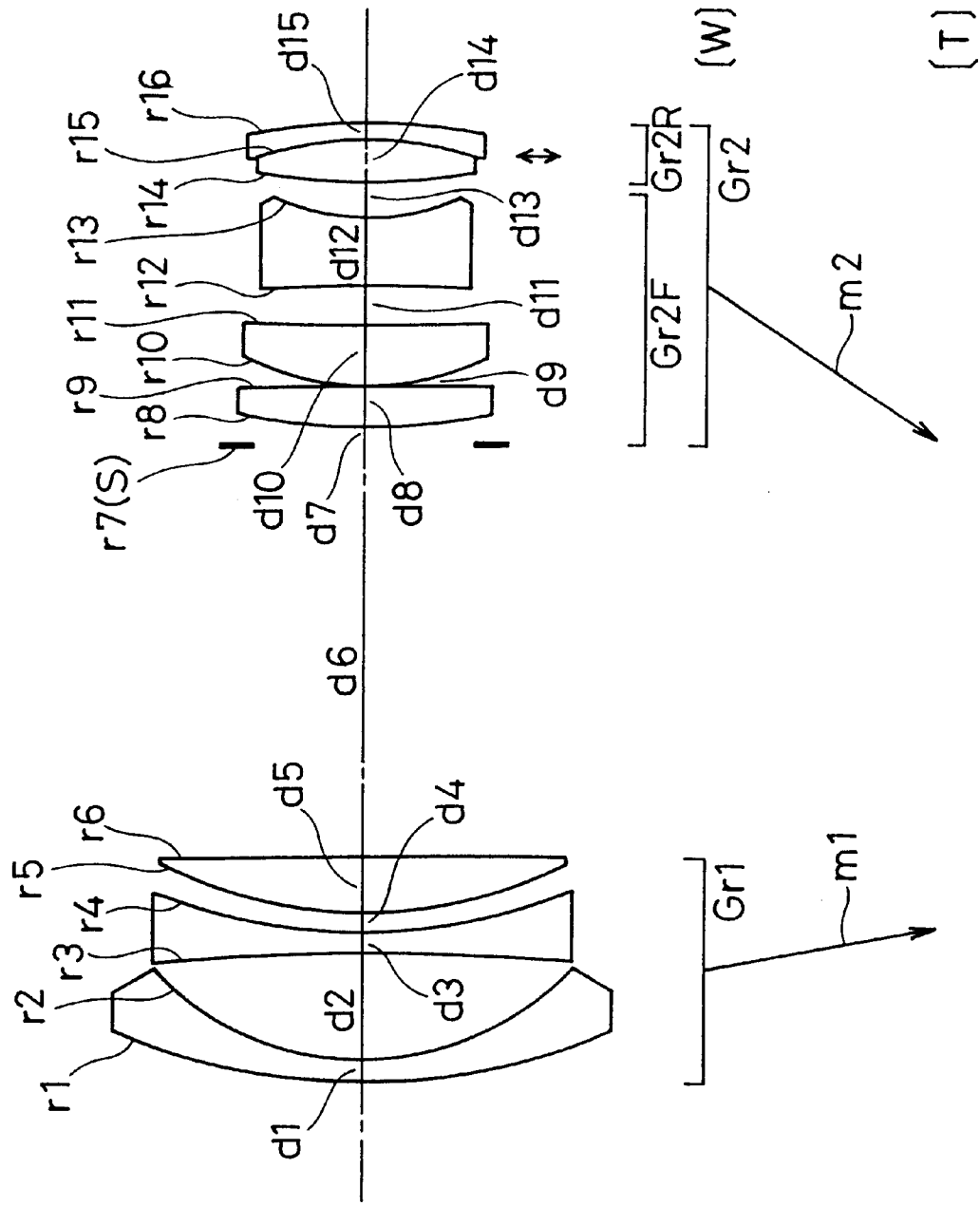
FIG. 1 is a diagram of the lens construction of a first embodiment of the present invention.
Figure 2:
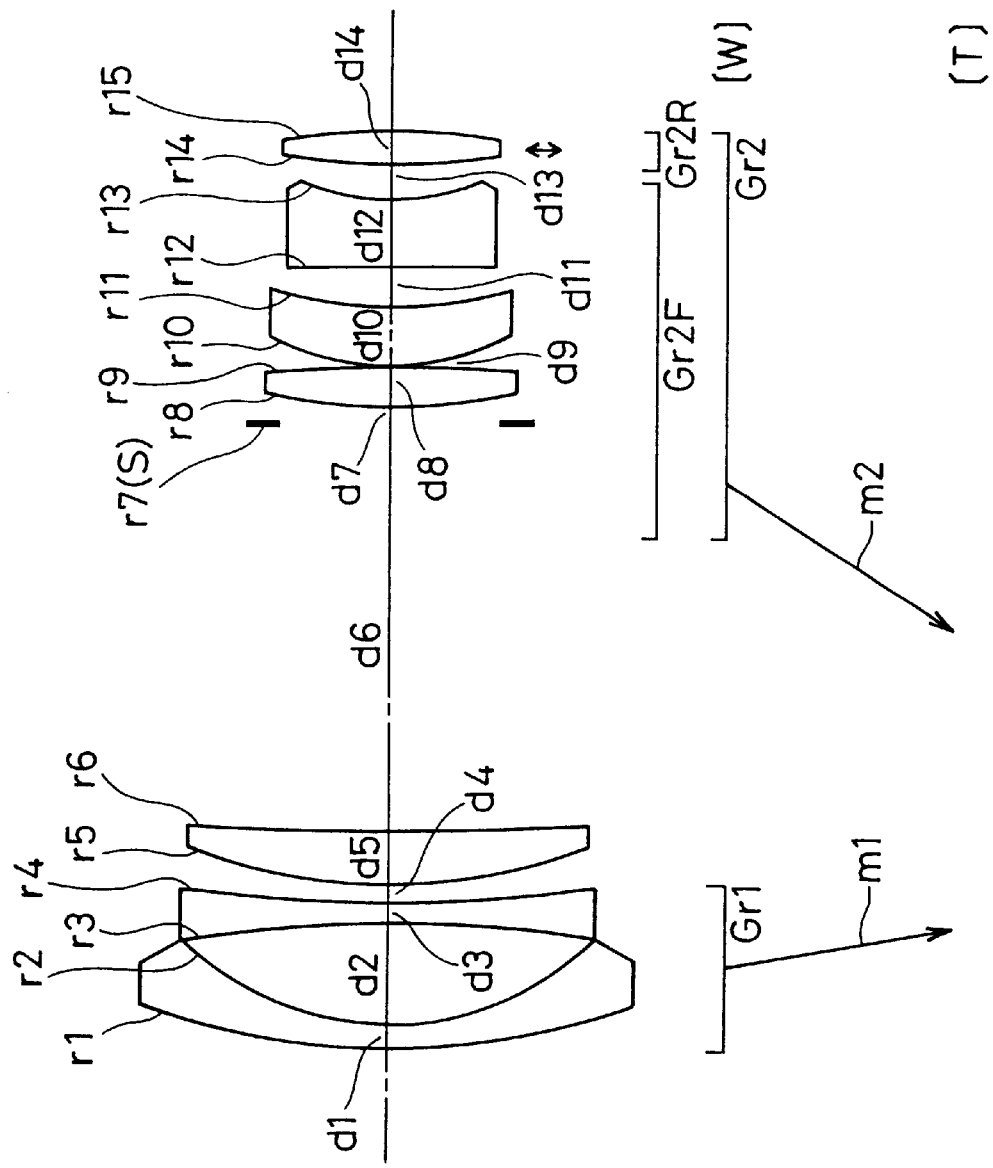
FIG. 2 is a diagram of the lens construction of a second embodiment of the present invention.
Figure 3:
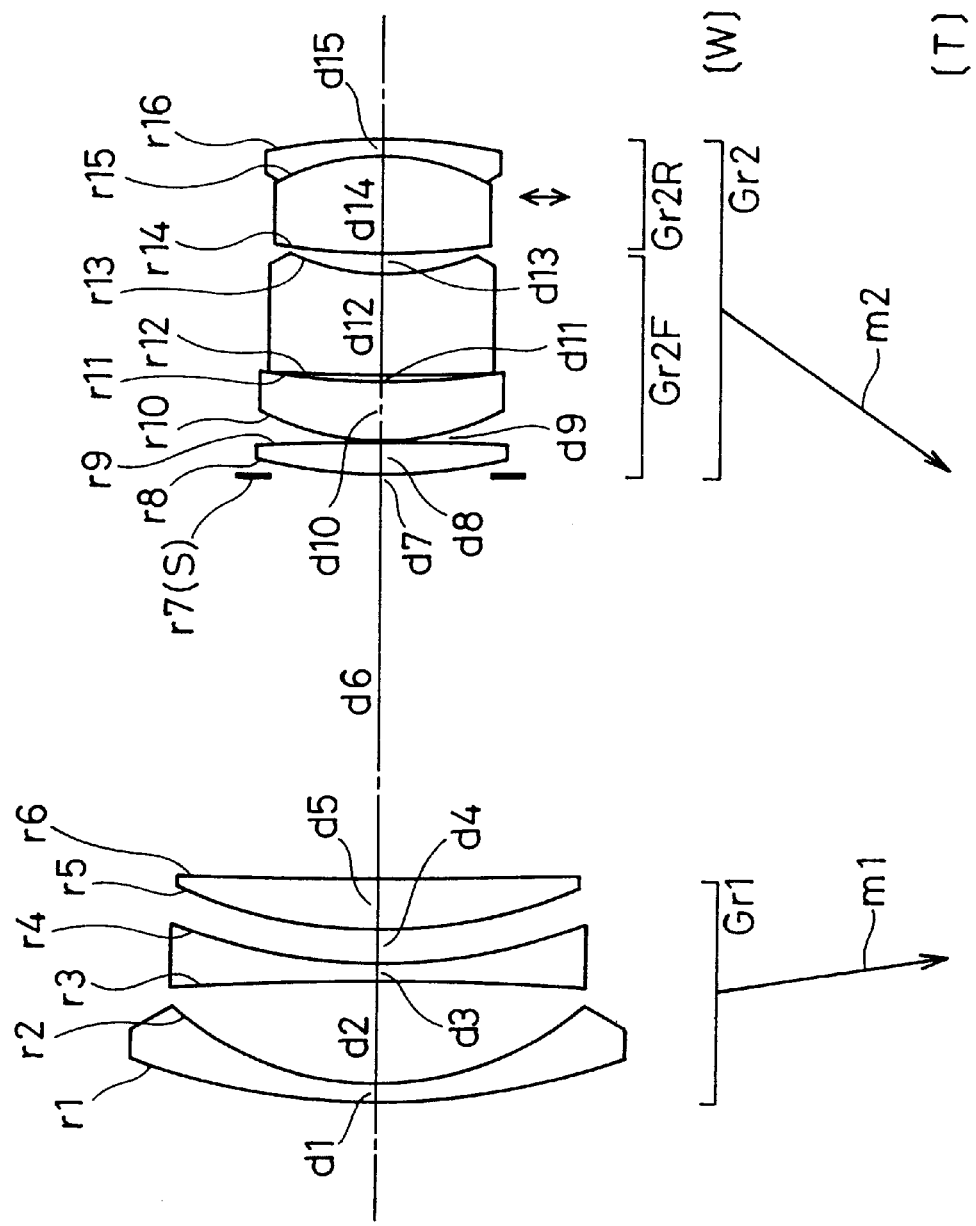
FIG. 3 is a diagram of the lens construction of a third embodiment of the present invention.
Figure 4A:
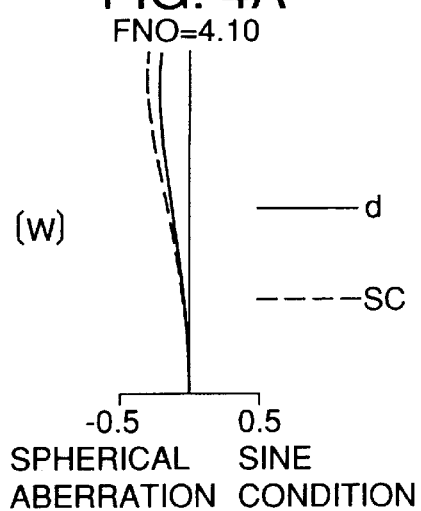
FIGS. 4A to 4I are graphic representations of aberrations in the first embodiment.
Figure 4B:
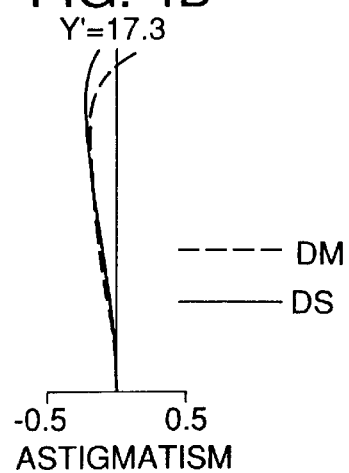
Figure 4C:
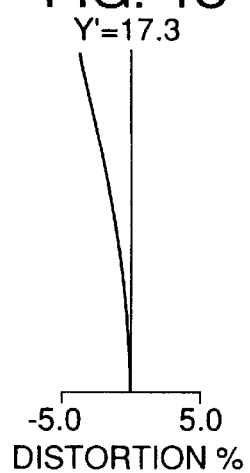
Figure 4D:
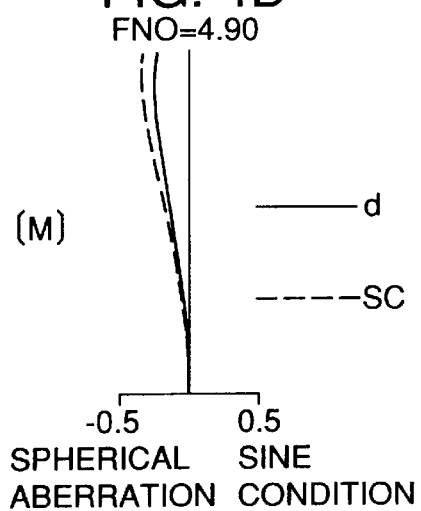
Figure 4E:
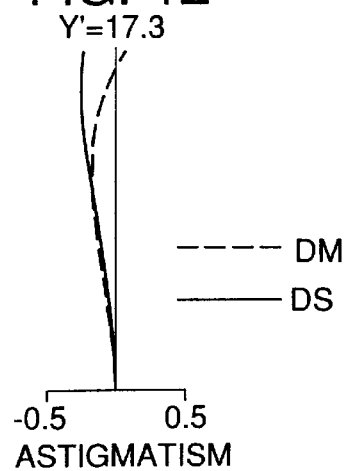
Figure 4F:
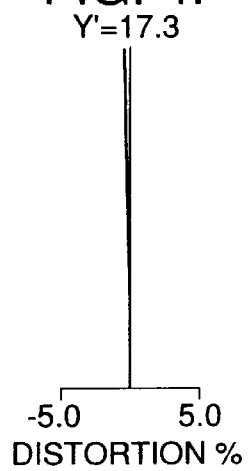
Figure 4G:
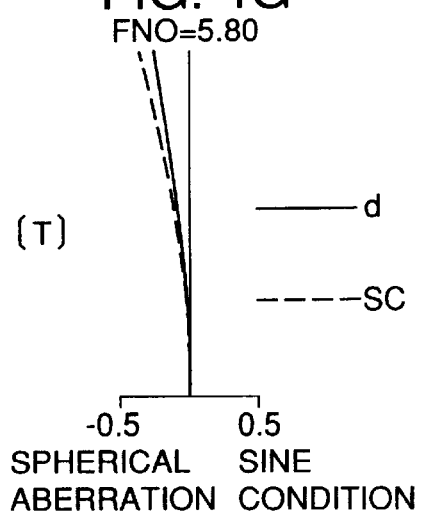
Figure 4H:
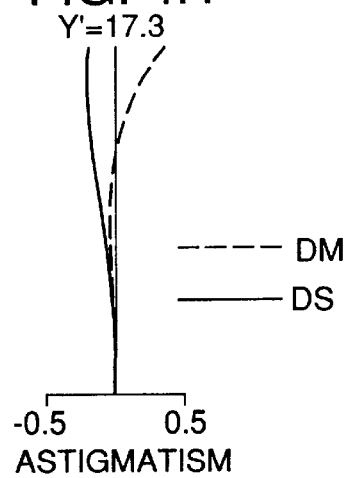
Figure 4I:
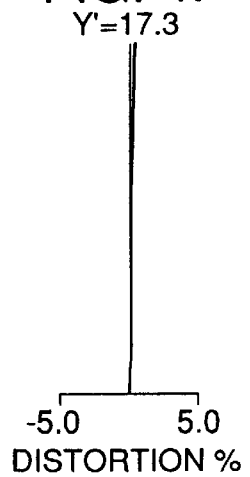
Figure 5A:
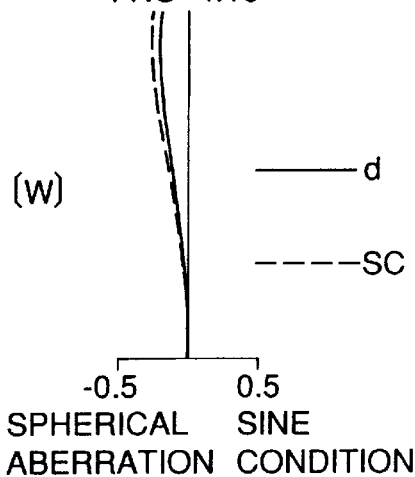
FIGS. 5A to 5I are graphic representations of aberrations in the second embodiment.
Figure 5B:
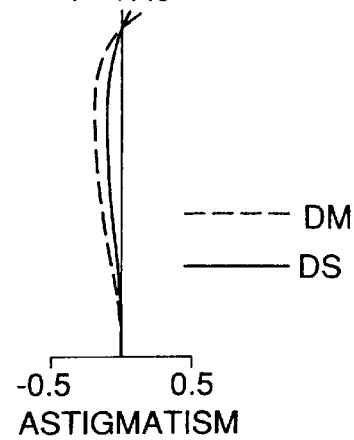
Figure 5C:
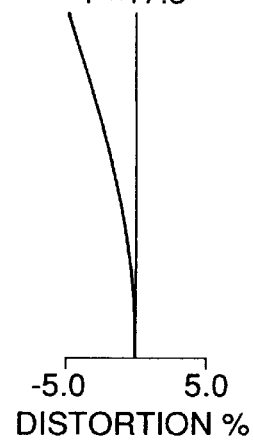
Figure 5D:
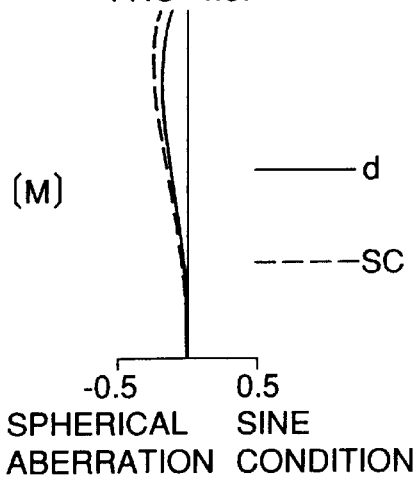
Figure 5E:
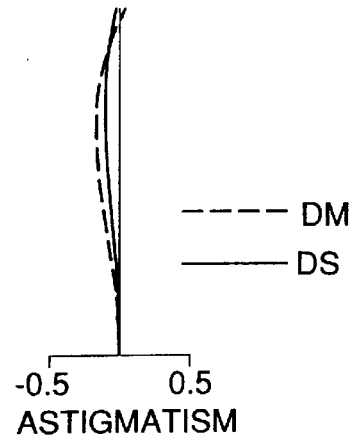
Figure 5F:
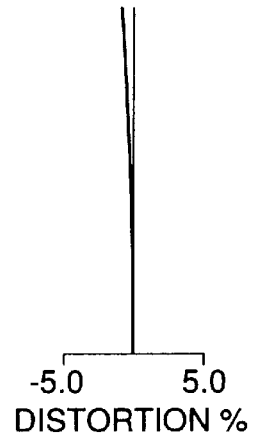
Figure 5G:
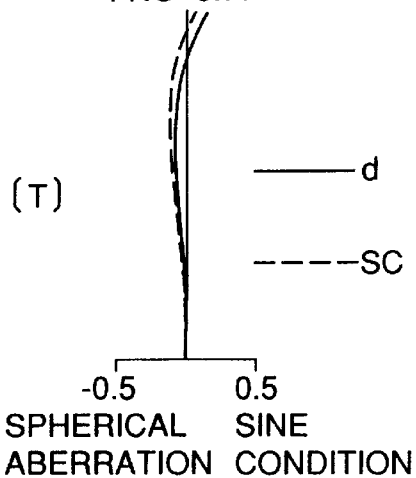
Figure 5H:
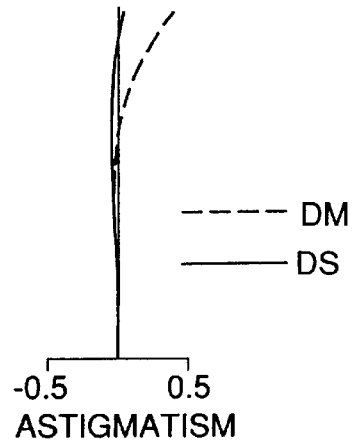
Figure 5I:
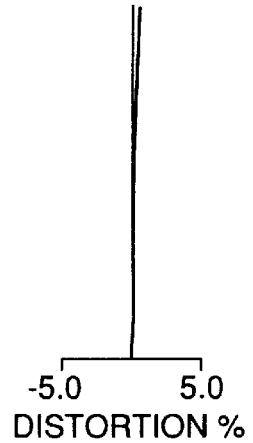
Figure 6A:
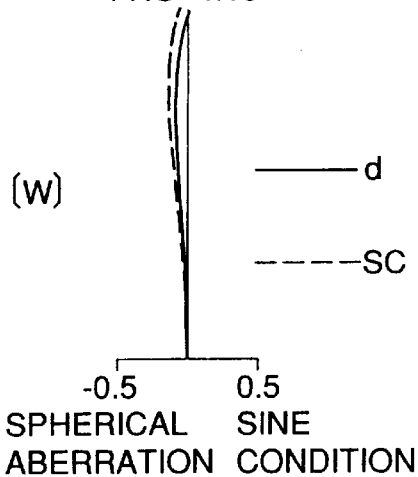
FIGS. 6A to 6I are graphic representations of aberrations in the third embodiment.
Figure 6B:
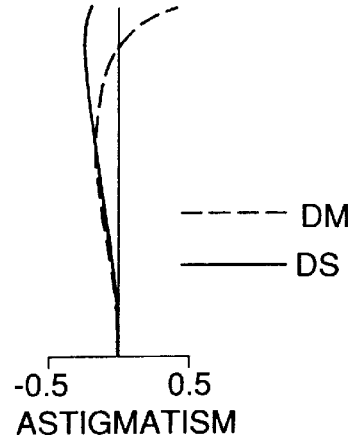
Figure 6C:
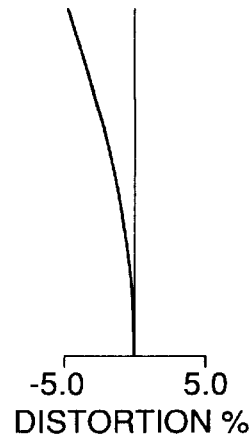
Figure 6D:
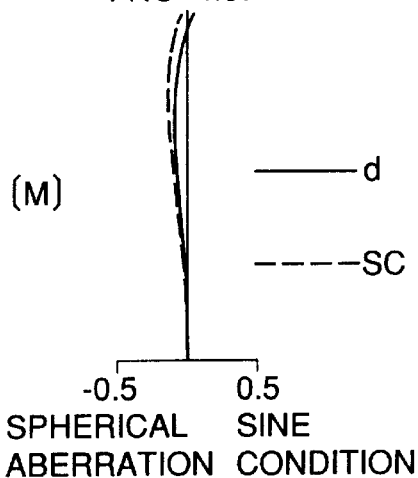
Figure 6E:
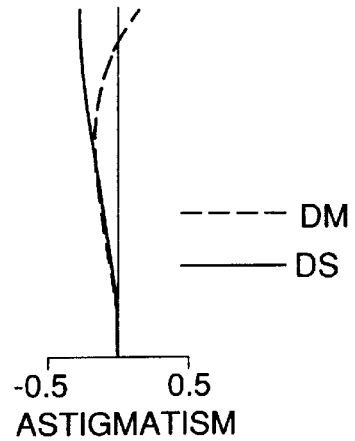
Figure 6F:
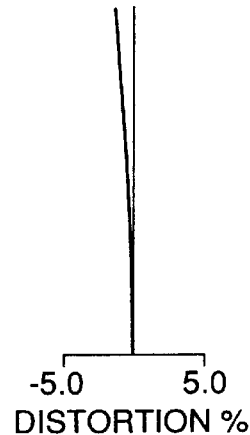
Figure 6G:
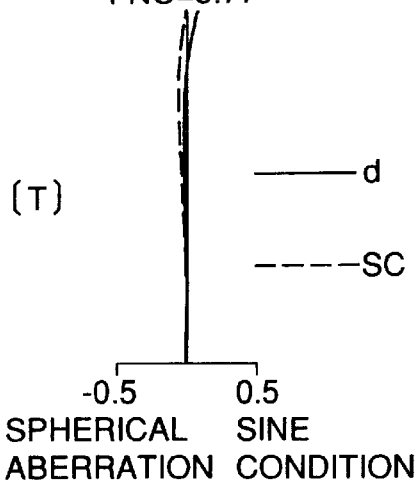
Figure 6H:
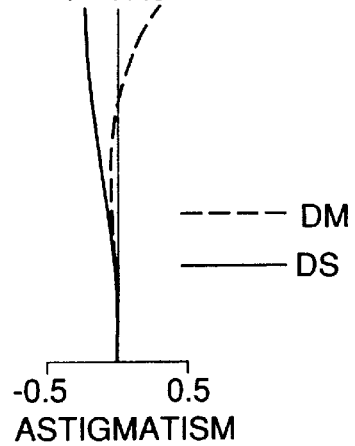
Figure 6I:
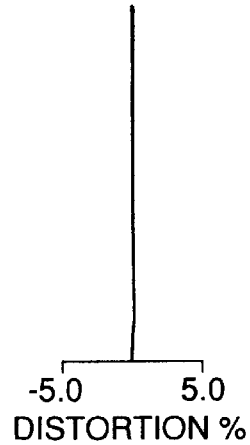
Figure 7A:
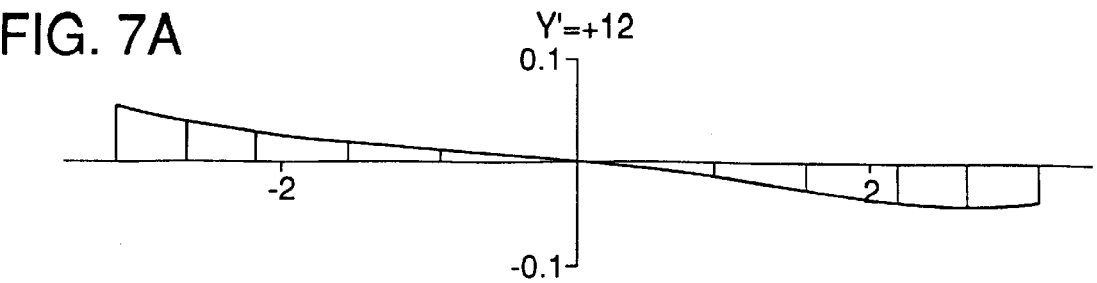
FIGS. 7A to 7E are graphic representations of lateral aberrations at the shortest focal length condition in the first embodiment.
Figure 7B:
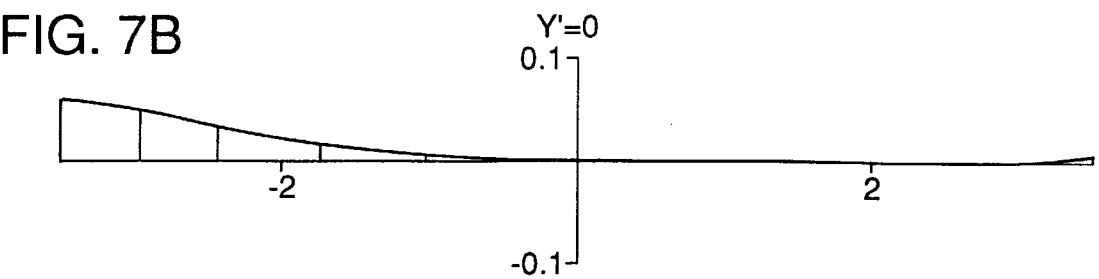
Figure 7C:
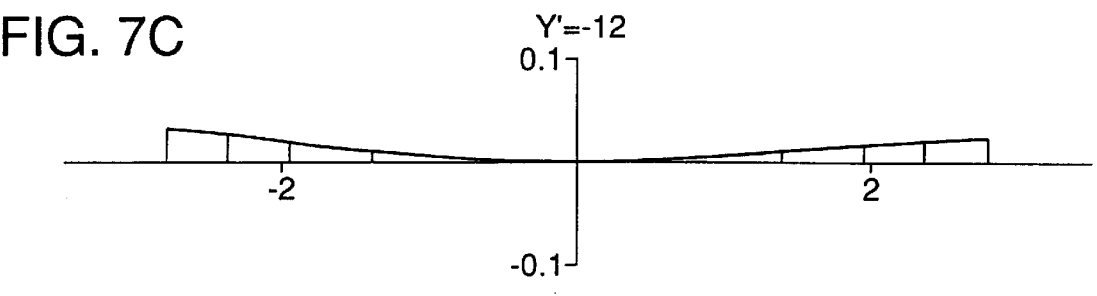
Figure 7D:
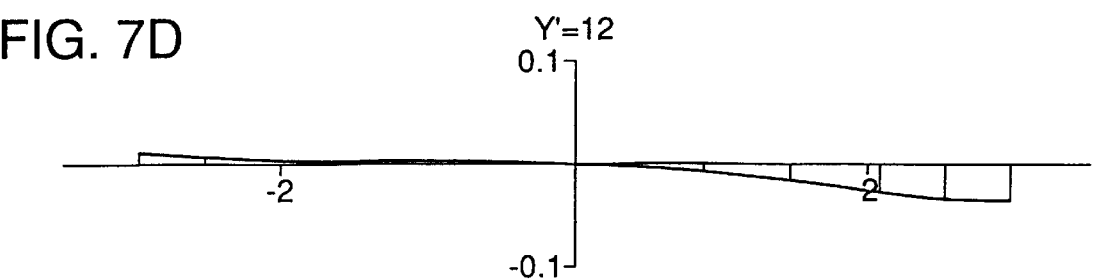
Figure 7E:
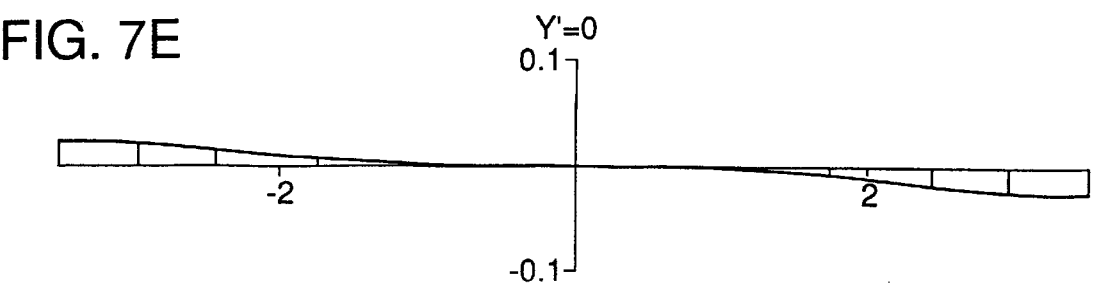
Figure 8A:
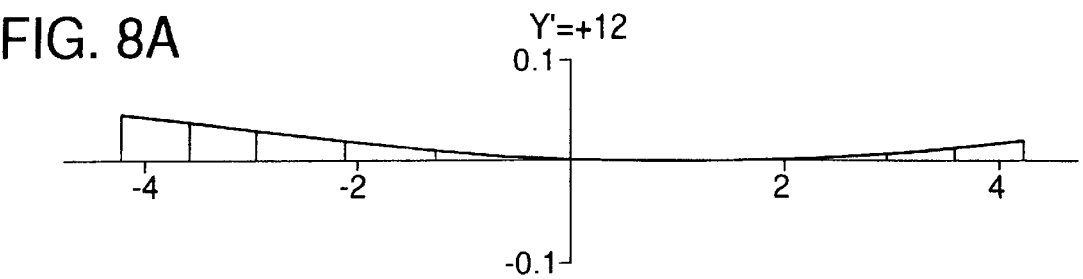
FIGS. 8A to 8E are graphic representations of lateral aberrations at the longest focal length condition in the first embodiment.
Figure 8B:
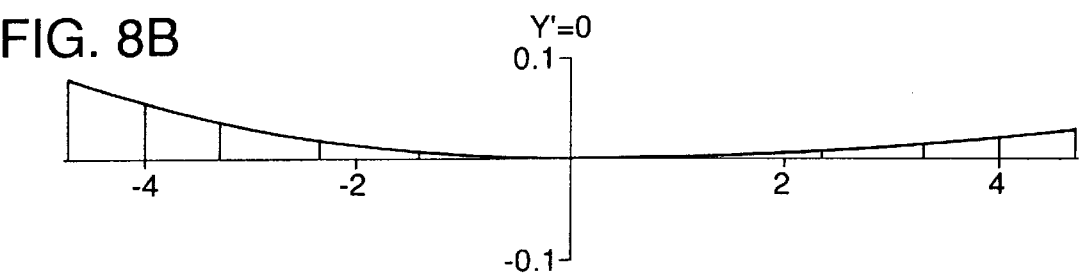
Figure 8C:
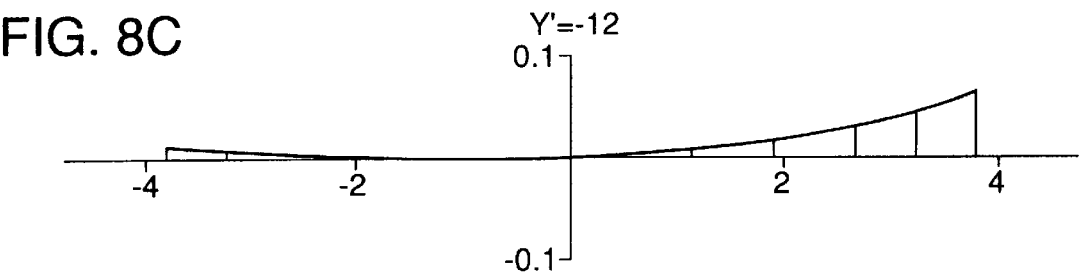
Figure 8D:
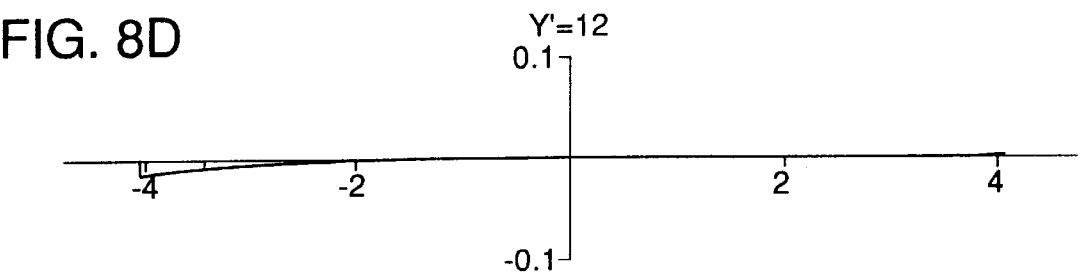
Figure 8E:
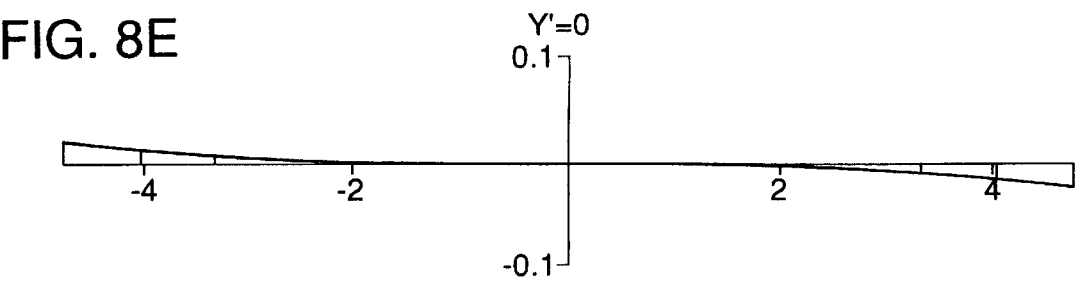
Figure 9A:
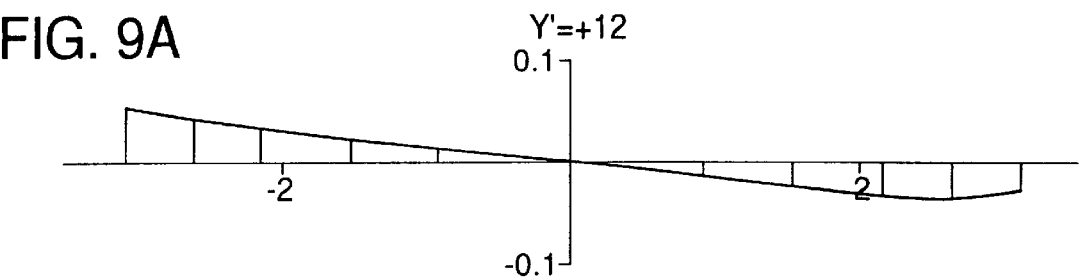
FIGS. 9A to 9E are graphic representations of lateral aberrations at the shortest focal length condition in the second embodiment.
Figure 9B:
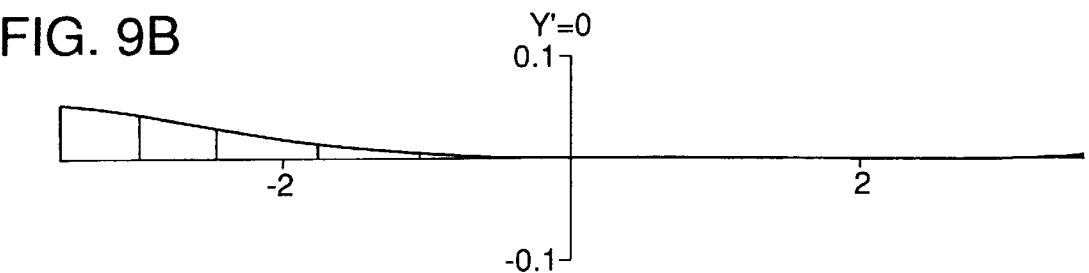
Figure 9C:
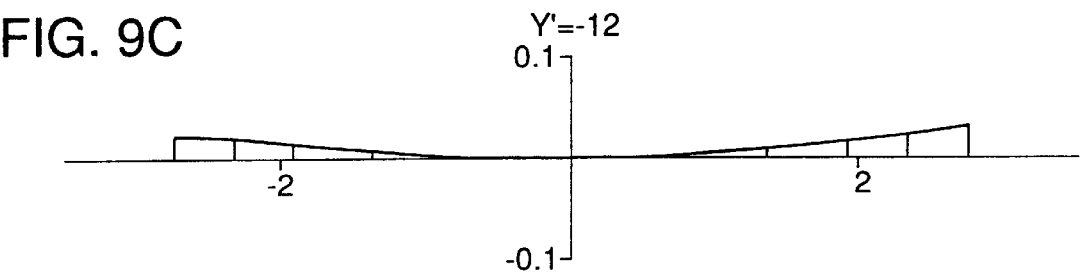
Figure 9D:
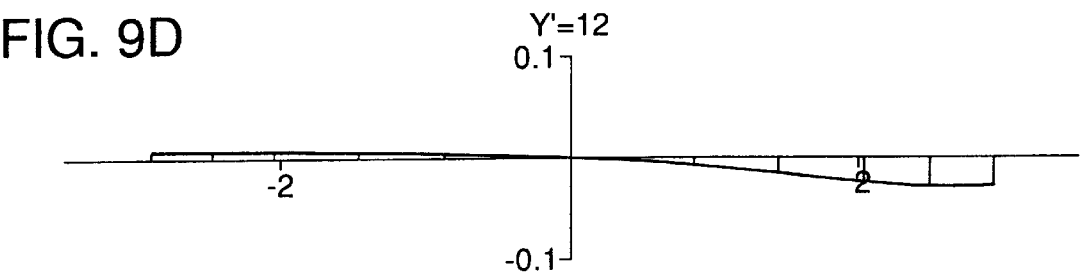
Figure 9E:
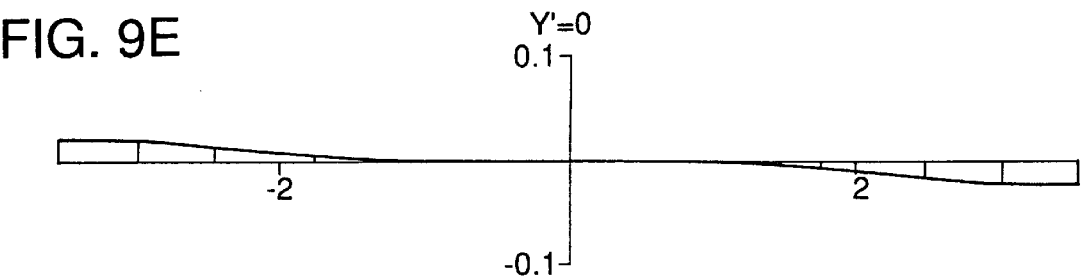
Figure 10A:
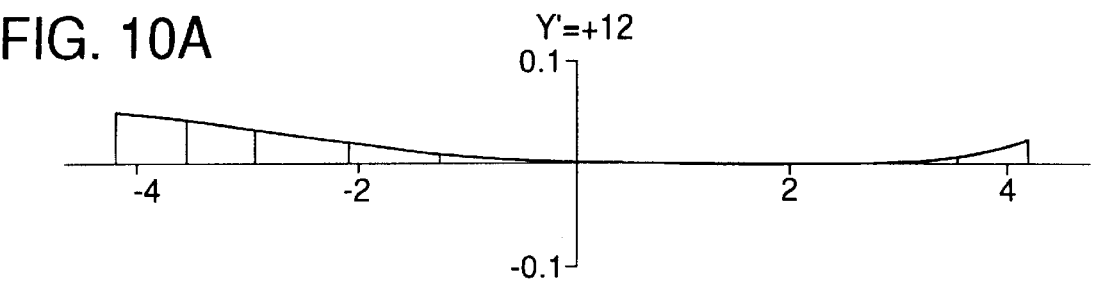
FIGS. 10A to 10E are graphic representations of lateral aberrations at the longest focal length condition in the second embodiment.
Figure 10B:
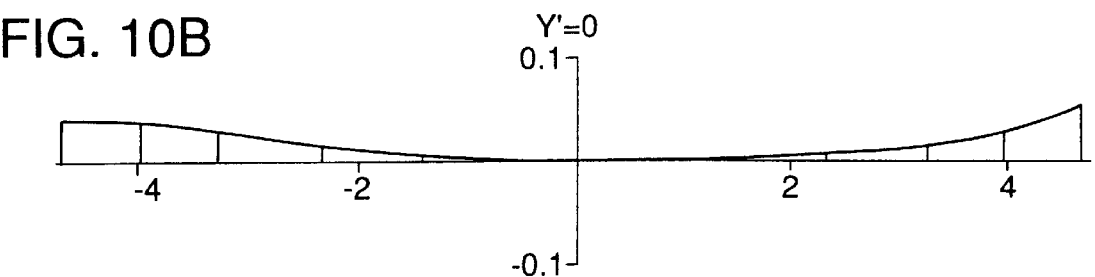
Figure 10C:
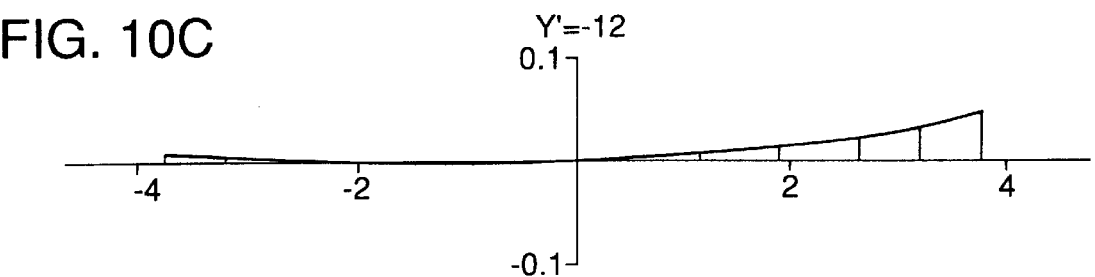
Figure 10D:
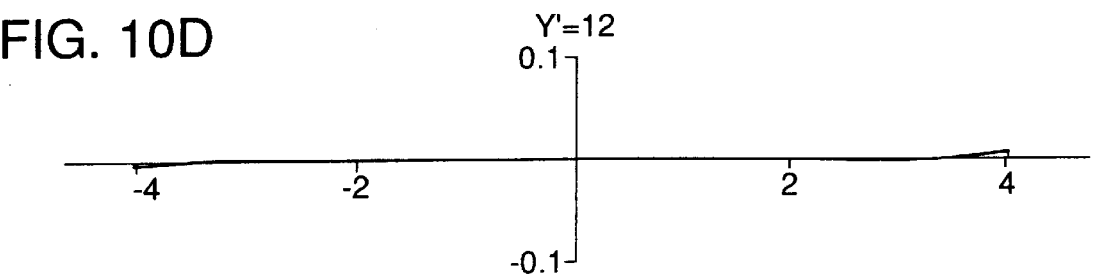
Figure 10E:
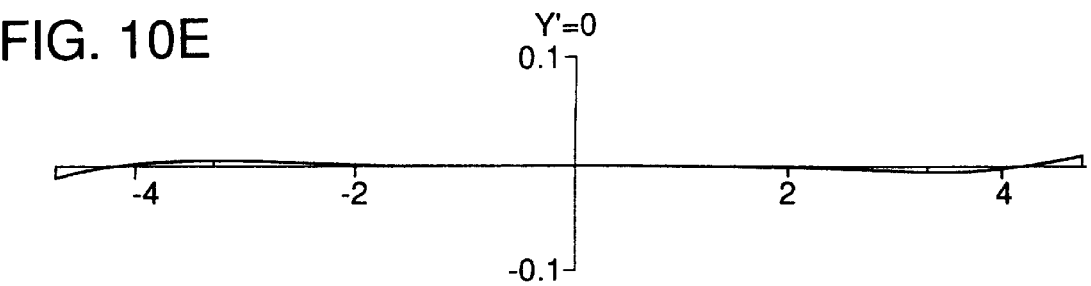
Figure 11A:
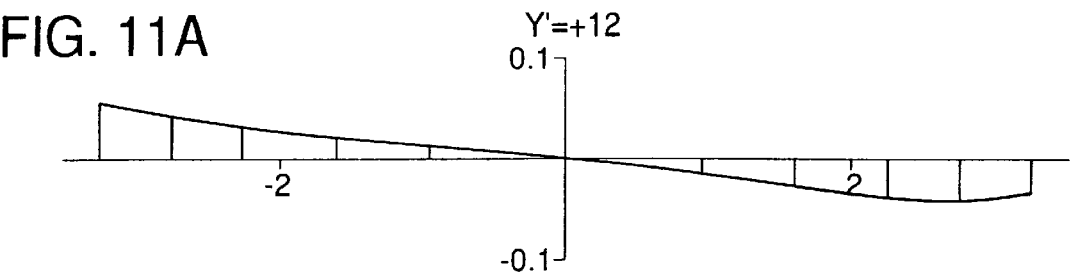
FIGS. 11A to 11E are graphic representations of lateral aberrations at the shortest focal length condition in the third embodiment.
Figure 11B:
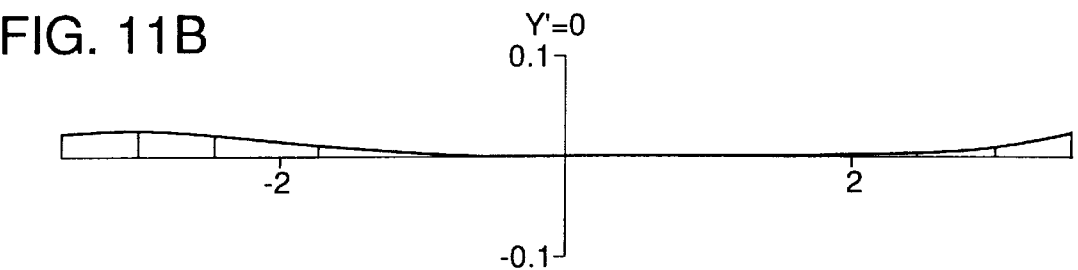
Figure 11C:
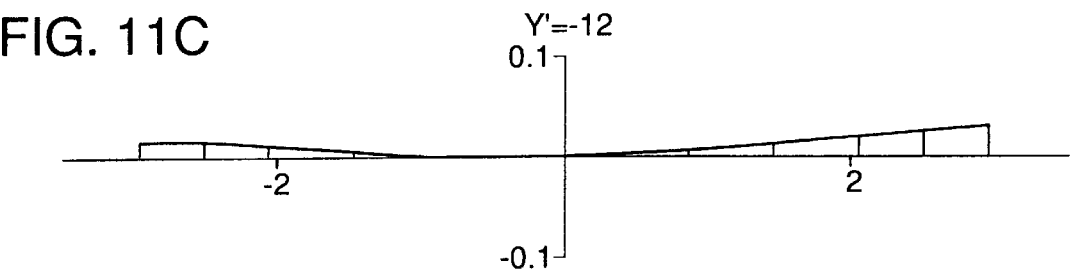
Figure 11D:
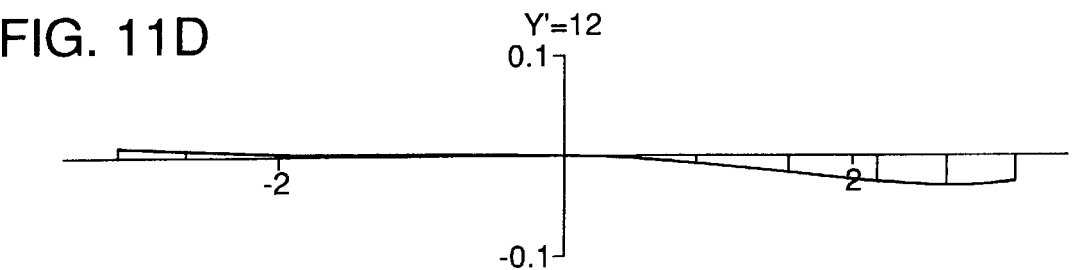
Figure 11E:
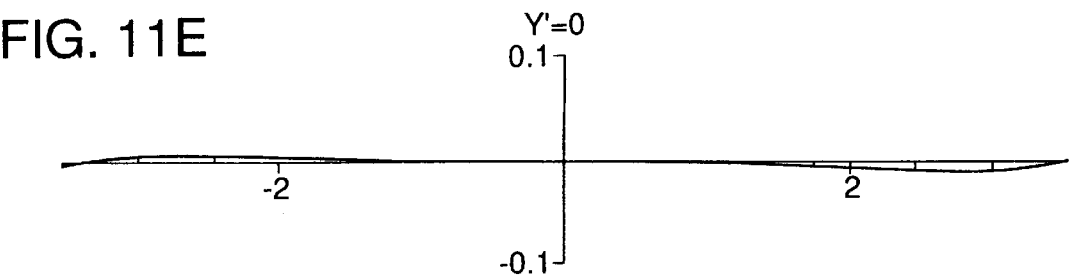
Figure 12A:
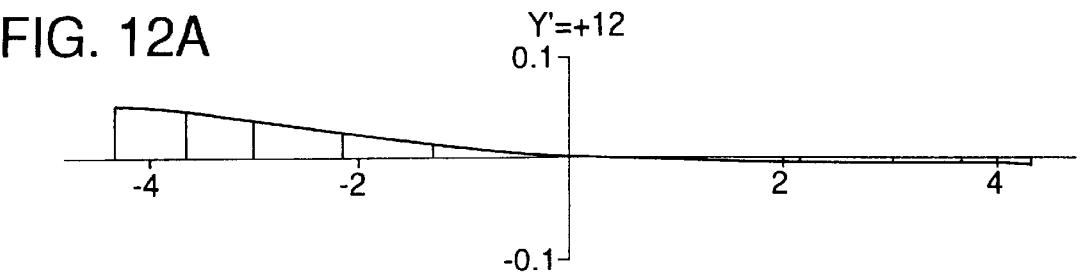
FIGS. 12A to 12E are graphic representations of lateral aberrations at the longest focal length condition in the third embodiment.
Figure 12B:
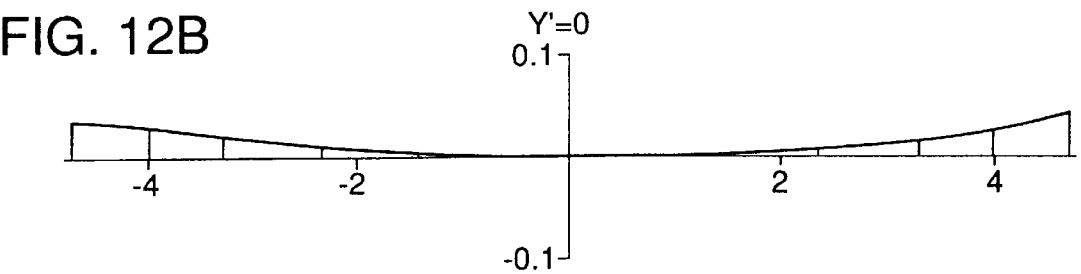
Figure 12C:
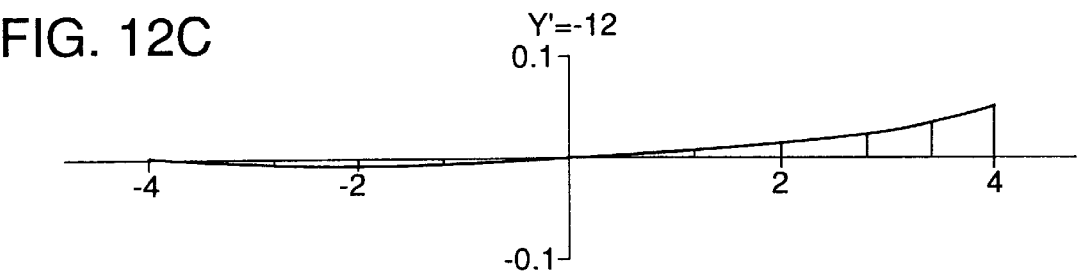
Figure 12D:
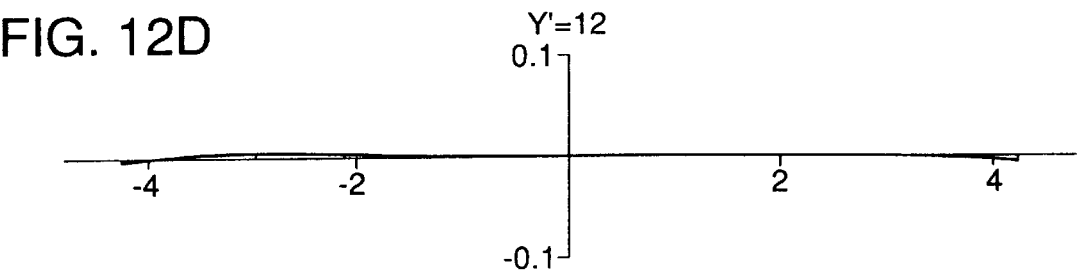
Figure 12E:
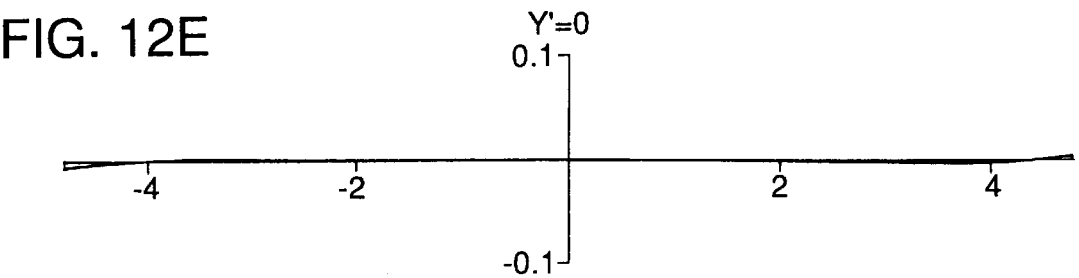

The zoom lens systems according to the first to fifth embodiments each comprise from the object side a first lens unit Gr1 having a negative optical power and a second lens unit Gr2 having a positive optical power. In zooming from the shortest focal length condition (W) to the longest focal length condition (T), the lens units are moved so that the distance therebetween decreases. In FIGS. 1 to 3, arrows m1 and m2 schematically show the movements of the first and second lens units Gr1 and Gr2 in zooming from the shortest focal length condition (W) to the longest focal length condition (T).

In the first embodiment, the first lens unit Gr1 comprises from the object side a negative meniscus lens element convex to the object side, a bi-concave negative lens element and a positive meniscus lens element convex to the object side, and the second lens unit Gr2 comprises from the object side a front lens unit Gr2F including an aperture diaphragm S, two positive meniscus lens elements convex to the object side and a biconcave negative lens element and a rear lens unit Gr2R including a positive doublet lens element consisting of a bi-convex positive lens element and a negative meniscus lens element.

In the second embodiment, the first lens unit Gr1 comprises from the object side a negative meniscus lens element convex to the object side, a bi-concave negative lens element and a positive meniscus lens element convex to the object side, and the second lens unit Gr2 comprises from the object side a front lens unit Gr2F including an aperture diaphragm S, a bi-convex positive lens element, a positive meniscus lens element convex to the object side and a bi-concave negative lens element and a rear lens unit Gr2R including a bi-convex positive lens element.

In the third embodiment, the first lens unit Gr1 comprises from the object side a negative meniscus lens element convex to the object side, a bi-concave negative lens element and a positive meniscus lens element convex to the object side, and the second lens unit Gr2 comprises from the object side a front lens unit Gr2F including an aperture diaphragm S, a bi-convex positive lens element, a positive meniscus lens element convex to the object side and a negative meniscus lens element concave to the image side and a rear lens unit Gr2R including a positive doublet lens element consisting of a bi-convex positive lens element and a negative meniscus lens element.

Figure 13:
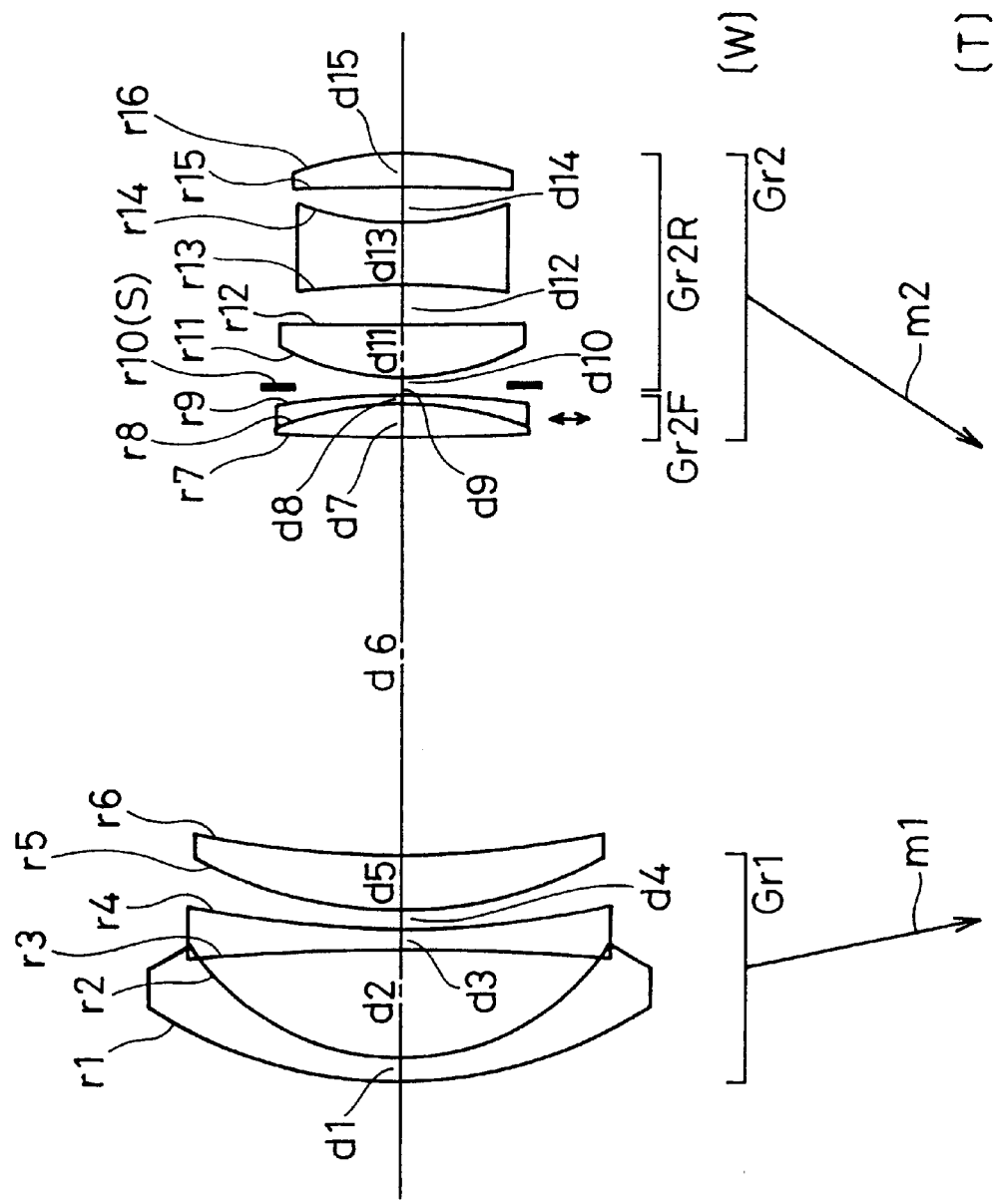
FIG. 13 is a diagram of the lens construction of the fourth embodiment.
Figure 14:
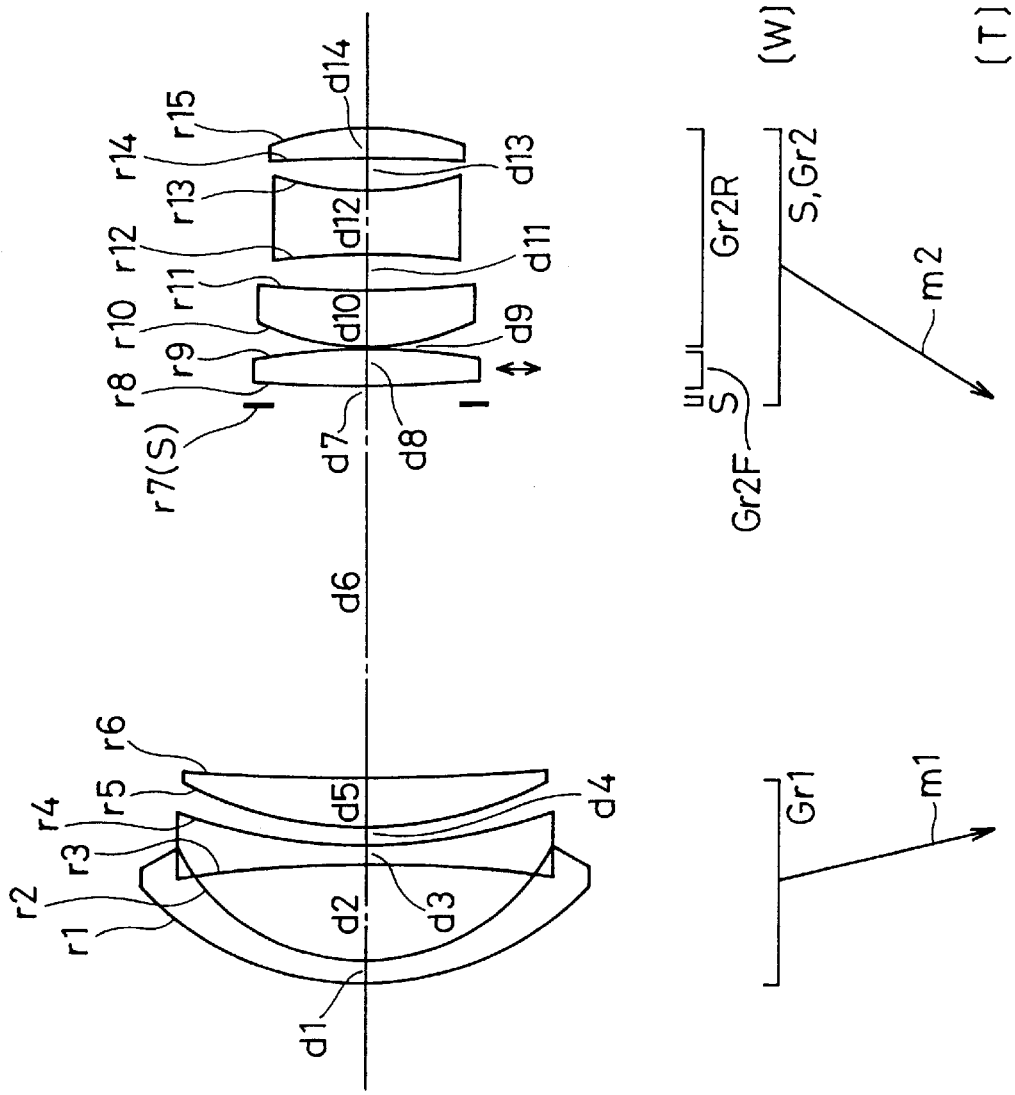
FIG. 14 is a diagram of the lens construction of the fifth embodiment.
Figure 15A:
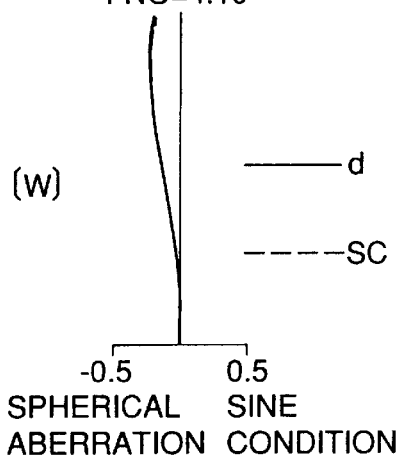
FIGS. 15A to 15I are graphic representations of aberrations in the fourth embodiment of the present invention.
Figure 15B:
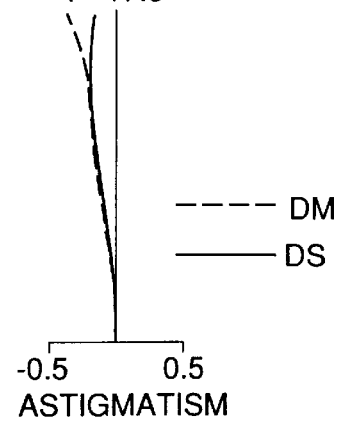
Figure 15C:
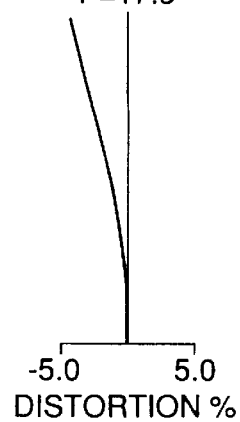
Figure 15D:
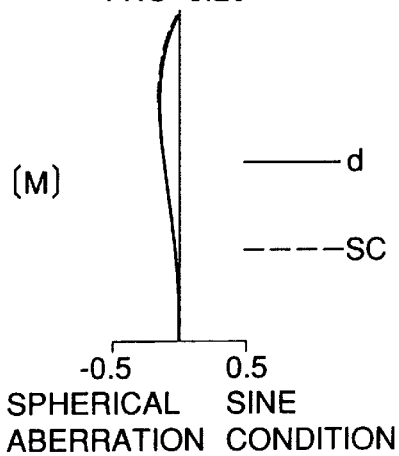
Figure 15E:
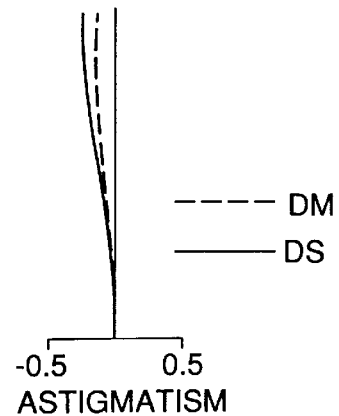
Figure 15F:
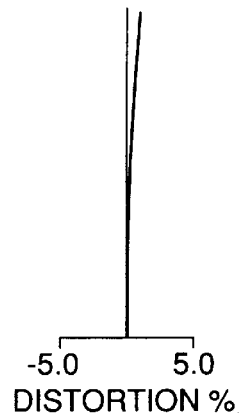
Figure 15G:
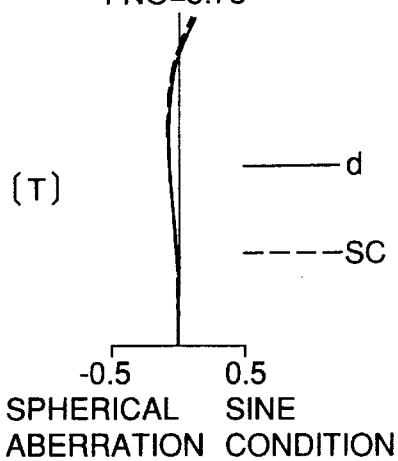
Figure 15H:
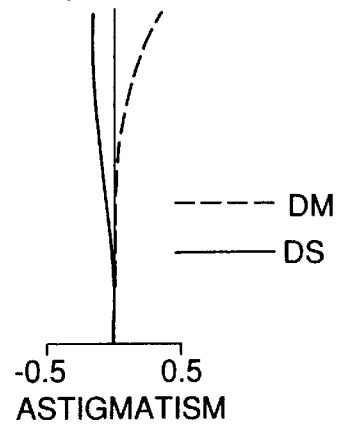
Figure 15I:
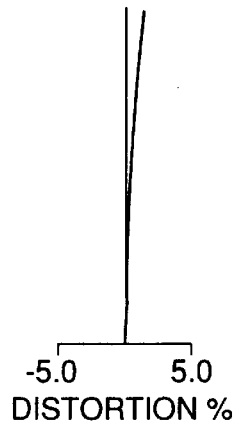
Figure 16A:
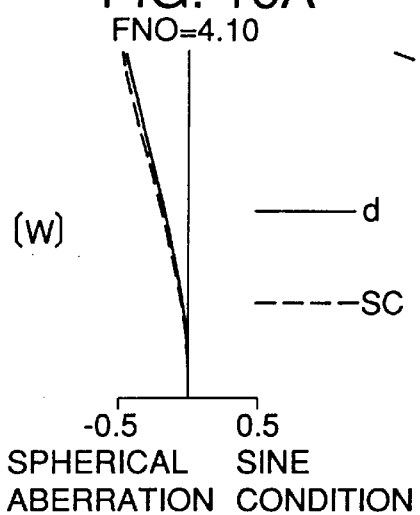
FIGS. 16A to 16I are graphic representations of aberrations in the fifth embodiment of the present invention.
Figure 16B:
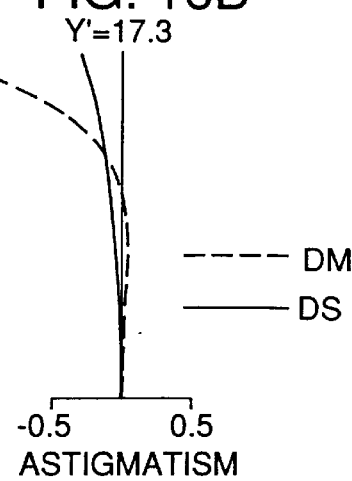
Figure 16C:
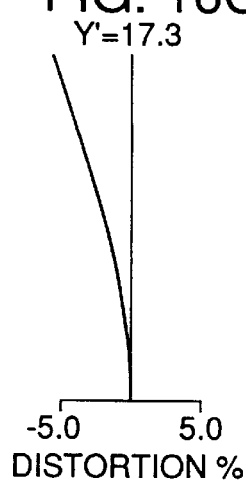
Figure 16D:
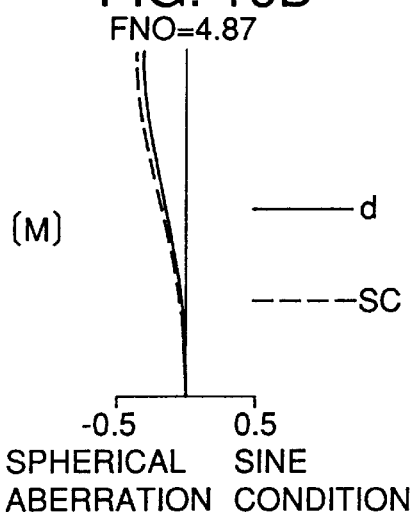
Figure 16E:
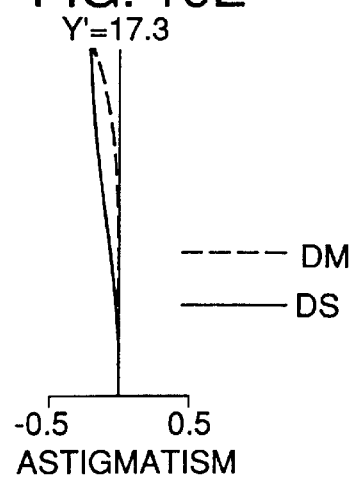
Figure 16F:
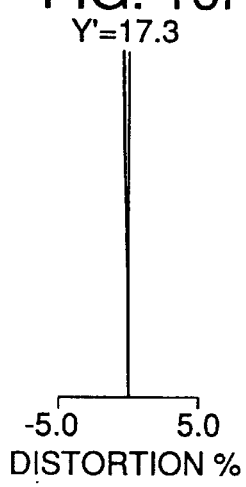
Figure 16G:
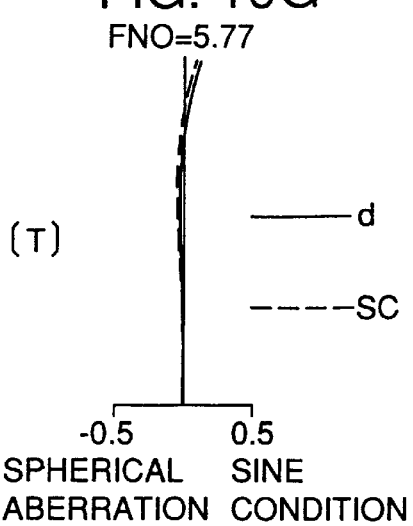
Figure 16H:
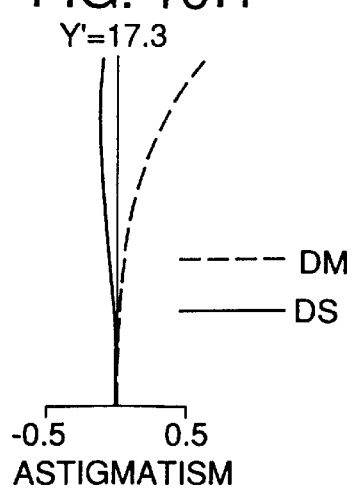
Figure 16I:
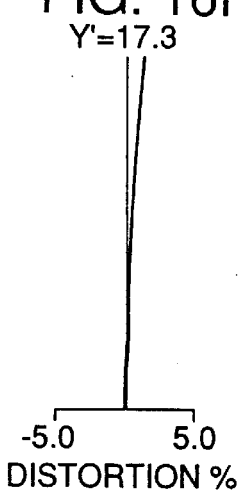
Figure 17A:
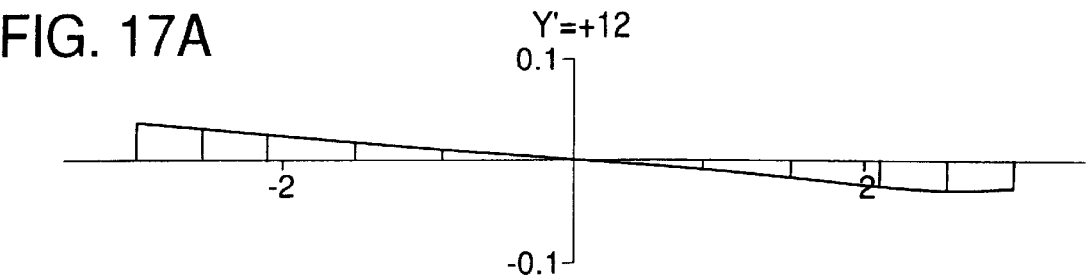
FIGS. 17A to 17E are graphic representations of lateral aberrations at the shortest focal length condition in the fourth embodiment.
Figure 17B:
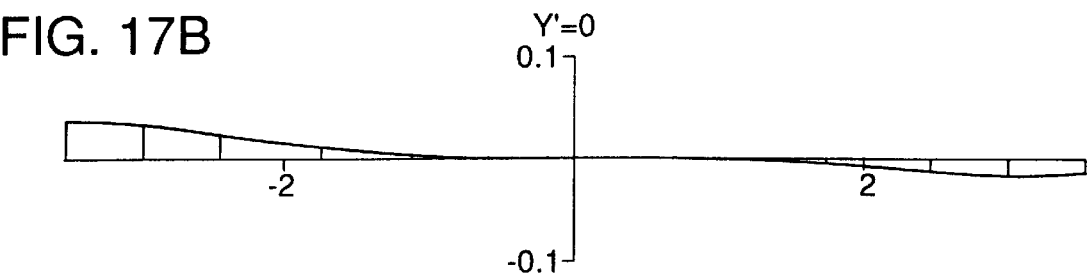
Figure 17C:
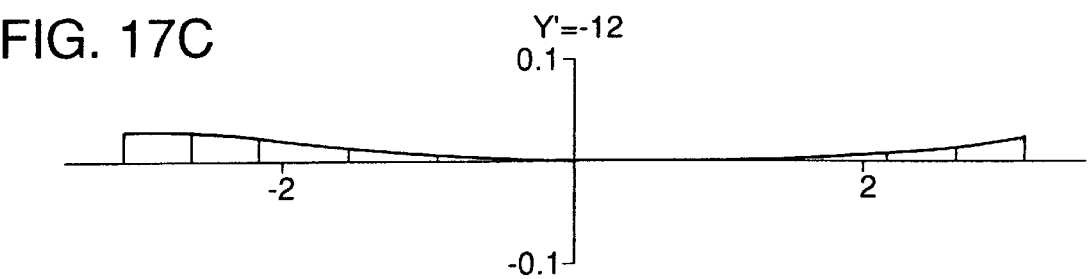
Figure 17D:
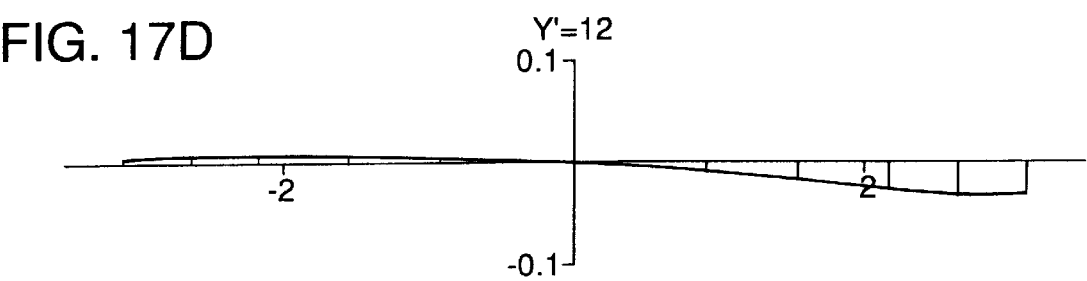
Figure 17E:
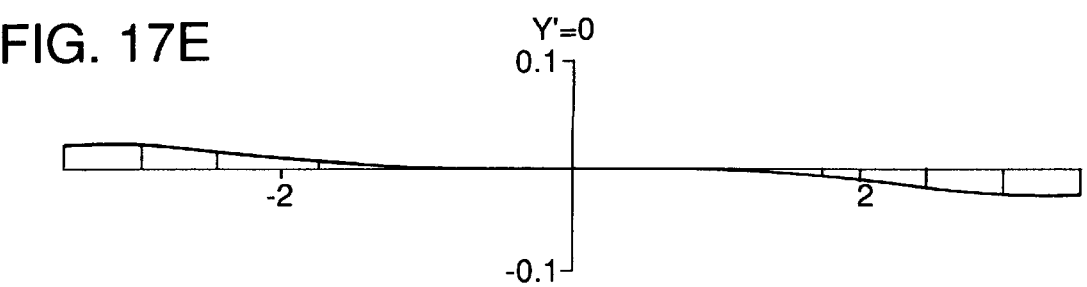
Figure 18A:
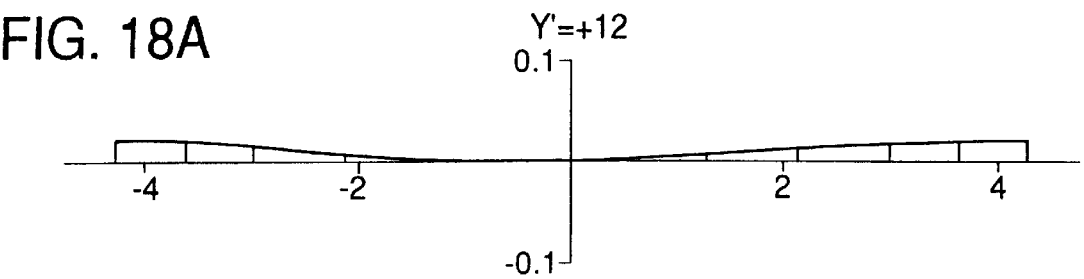
FIGS. 18A to 18E are graphic representations of lateral aberrations at the longest focal length condition in the fourth embodiment.
Figure 18B:
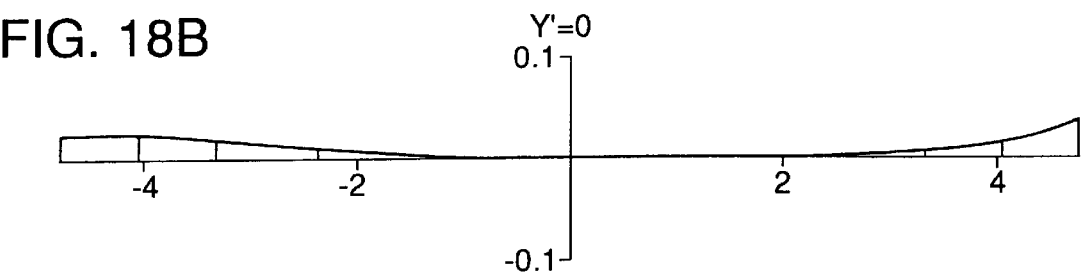
Figure 18C:
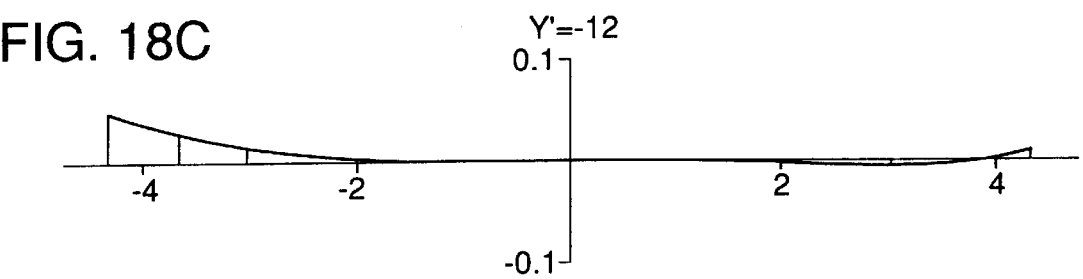
Figure 18D:
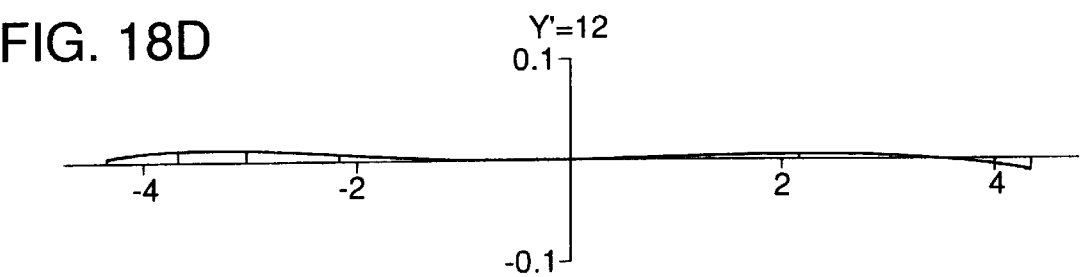
Figure 18E:
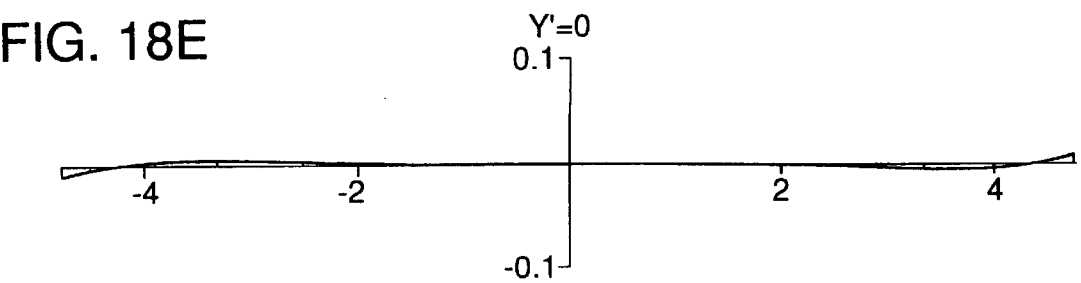
Figure 19A:
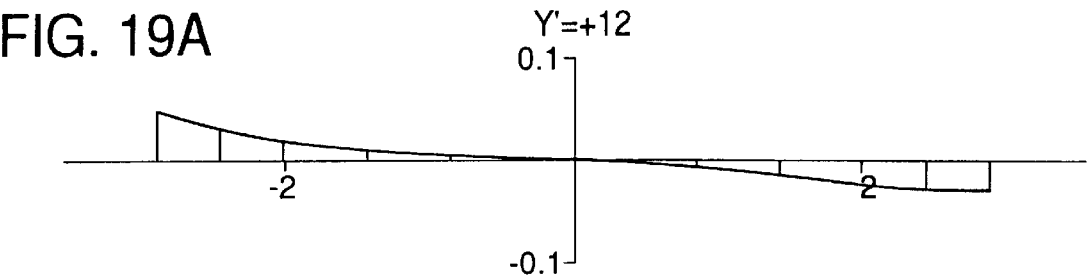
FIGS. 19A to 19E are graphic representations of lateral aberrations at the shortest focal length condition in the fifth embodiment.
Figure 19B:
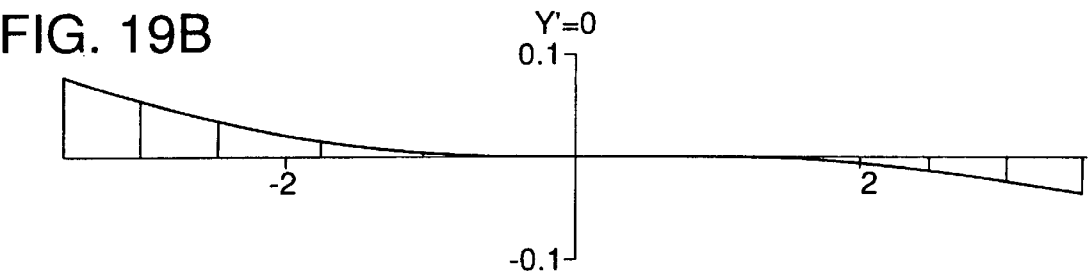
Figure 19C:
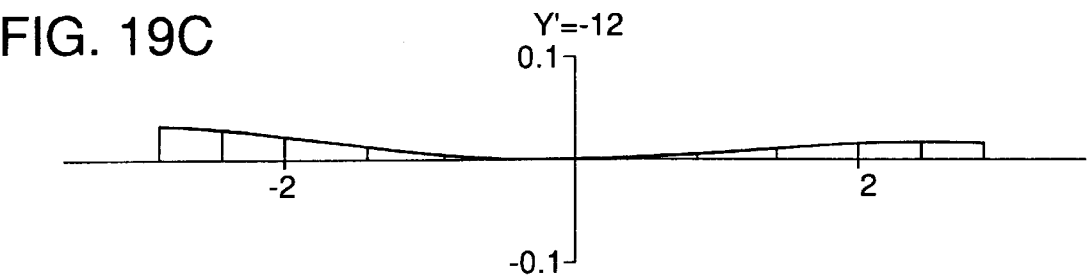
Figure 19D:
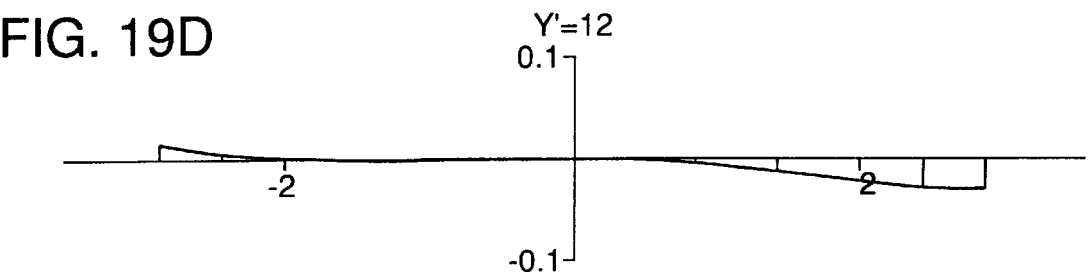
Figure 19E:
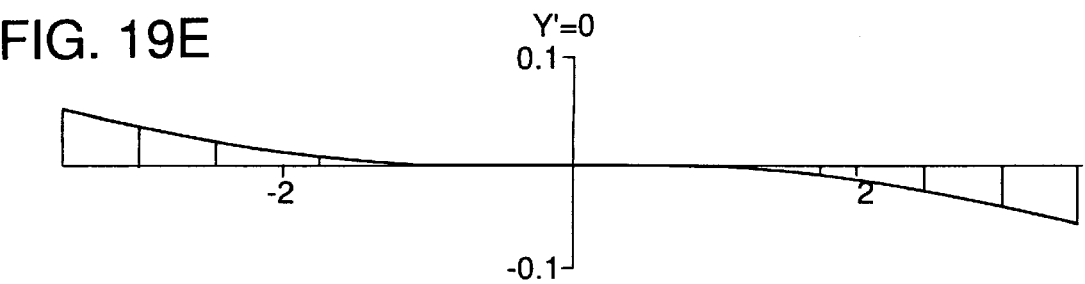
Figure 20A:
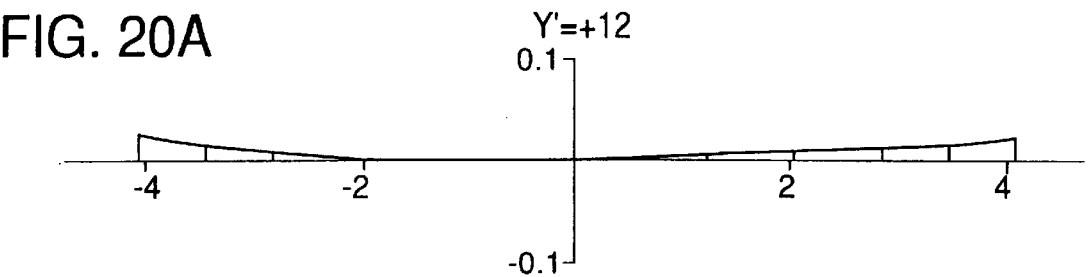
FIGS. 20A to 20E are graphic representations of lateral aberrations at the longest focal length condition in the fifth embodiment.
Figure 20B:
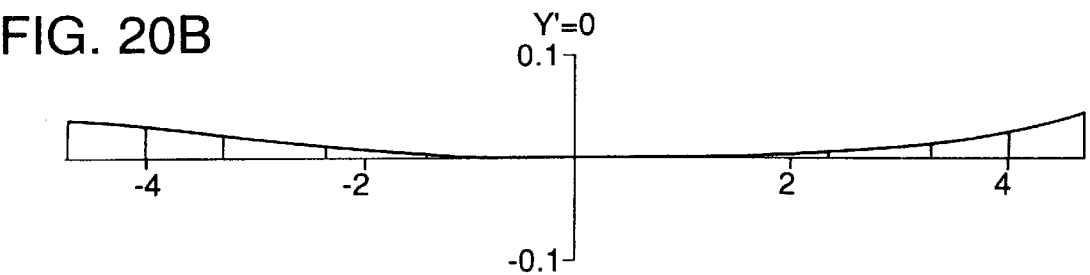
Figure 20C:
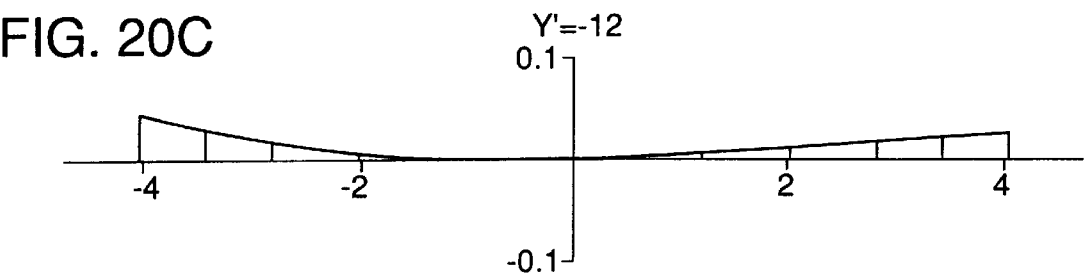
Figure 20D:
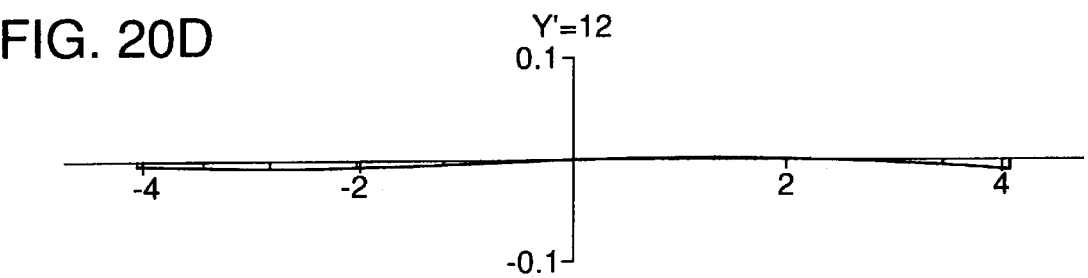
Figure 20E:
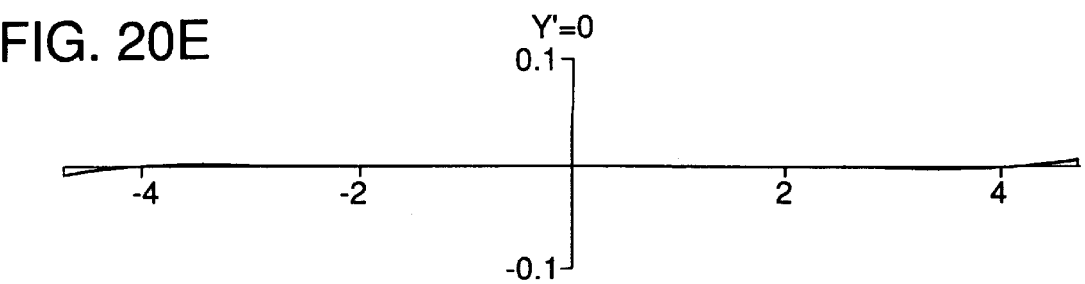

The zoom lens systems according to the fourth and fifth embodiments of the present invention each comprise from the object side a first lens unit Gr1 having a negative optical power and a second lens unit Gr2 having a positive optical power. In zooming from the shortest focal length condition (W) to the longest focal length condition (T), the lens units are moved so that the distance therebetween decreases. In FIGS. 13 and 14, arrows m1 and m2 schematically show the movements of the first and second lens units Gr1 and Gr2 in zooming from the shortest focal length condition (W) to the longest focal length condition (T).

In the fourth embodiment, the first lens unit Gr1 comprises from the object side a negative meniscus lens element convex to the object side, a bi-concave negative lens element and a positive meniscus lens element convex to the object side, and the second lens unit Gr2 comprises from the object side a front lens unit Gr2F including a positive doublet lens element consisting of a bi-convex positive lens element and a negative meniscus lens element and a rear lens unit Gr2R including an aperture diaphragm S, a positive meniscus lens element convex to the object side, a bi-concave negative lens element and a positive meniscus lens element convex to the image side.

In the fifth embodiment, the first lens unit Gr1 comprises from the object side a negative meniscus lens element convex to the object side, a bi-concave negative lens element and a positive meniscus lens element convex to the object side, and the second lens unit Gr2 comprises from the object side a front lens unit Gr2F including a bi-convex positive lens element and a rear lens unit Gr2R including a positive meniscus lens element convex to the object side, a bi-concave negative lens element and a positive meniscus lens element convex to the image side. Between the first and second lens units Gr1 and Gr2, an aperture diaphragm S is disposed which is moved together with the second lens unit Gr2 in zooming.

In zoom lens systems like those of the above-described embodiments comprising from the object side the first lens unit Gr1 having a negative optical power and the second lens unit Gr2 having a positive optical power, the lens units are moved so that the distance therebetween decreases in zooming from the shortest focal length condition (W) to the longest focal length condition (T). Therefore, the lens arrangement at the shortest focal length condition (W) constitutes a typical retro type lens system, while the lens arrangement at the longest focal length condition (T) is far from a retro type lens system. Consequently, the zoom lens system of this type has a sufficient back focal length at the shortest focal length condition (W) and has excellent optical performance at a wide angle of view. On the other hand, at the longest focal length condition (T), size reduction is achieved and excellent optical performance is obtained.

In zoom lens systems like those of the above-described embodiments comprising from the object side the first lens unit Gr1 having a negative optical power and the second lens unit Gr2 having a positive optical power wherein zooming is performed by varying the distance between the first and second lens units Gr1 and Gr2 (for example, by decreasing the distance between the first and second lens units Gr1 and Gr2 in zooming from the shortest focal length condition (W) to the longest focal length condition (T)), it is preferable that the following condition should be fulfilled:

$$-1.0 < \phi1/\phi2 < -0.4 \tag{1}$$

where $\phi1$ represents the optical power of the first lens unit Gr1; and $\phi2$ represents the optical power of the second lens unit Gr2.

The condition (1) defines the ratio between the optical powers of the zooming lens units. Fulfilling the condition (1) is necessary to realize a compact wide-angle zoom lens system. When the lower limit of the condition (1) is exceeded, the lens diameter of the second lens unit Gr2 and the portion therebehind increases and the back focal length becomes greater than necessary. As a result, compactness is lost. When the upper limit of the condition (1) is exceeded, the Petzval sum generated in the first lens unit Gr1 is excessively great in the negative direction, so that it is difficult to correct it with the second lens unit Gr2. For this reason, excellent imaging performance cannot be obtained. In addition, when the upper limit of the condition (1) is exceeded, a back focal length cannot be obtained which is necessary for lens systems for single-lens reflex cameras.

It is further preferable that the following conditions (1a) and (1b) should be fulfilled:

$$-1.0 < \phi1/\phi2 < -0.55 \tag{1a}$$

$$-0.8 < \phi1/\phi2 < -0.4 \tag{1b}$$

The condition (1a) defines a range in which the upper limit of the condition (1) is limited to −0.55. By not exceeding the upper limit of the condition (1a), more excellent imaging performance is obtained. The condition (1b) defines a range in which the lower limit of the condition (1) is limited to −0.8. By not exceeding the lower limit of the condition (1b), a more compact optical system is obtained.

In zoom lens systems like those of the above-described embodiments comprising from the object side the first lens unit Gr1 having a negative optical power and the second lens unit Gr2 having a positive optical power wherein zooming is performed by varying the distance between the first and second lens units Gr1 and Gr2 (for example, by decreasing the distance between the first and second lens units Gr1 and Gr2 in zooming from the shortest focal length condition (W) to the longest focal length condition (T)), the first lens unit Gr1 is large in diameter and heavy in weight. For this reason, using the whole or a part of the first lens unit Gr1 as the camera shake compensation unit is not preferable since the load imposed on the camera shake compensation drive system is heavy. The second lens unit Gr2 comprising comparatively lightweight lens elements is preferable as the camera shake compensation unit. However, using the whole of the second lens unit Gr2 as the camera shake compensation unit is not preferable since the load imposed on the camera shake compensation drive system is heavy.

Therefore, in the above-described embodiments, the second lens unit Gr2 comprises from the object side the front lens unit Gr2F having a positive optical power and the rear lens unit Gr2R having a positive optical power, and the rear lens unit Gr2R is parallelly decentered (that is, shifted perpendicularly or substantially perpendicularly to the optical axis) to compensate for camera shake. While the second lens unit Gr2 is overall positive, by dividing it into the two units Gr2F and Gr2R each having a positive optical power, aberrations generated in the second lens unit Gr2 may be shared therebetween. Consequently, the second lens unit Gr2 may be constructed so that a surface or a lens element having a high curvature and generating great aberrations is not included.

Assuming that the second lens unit Gr2 is divided into a unit having a positive optical power and a unit having a negative optical power, the unit having a positive optical power is provided with an optical power higher than that of the second lens unit Gr2, so that the second lens unit Gr2 includes a surface or a lens element having a high curvature and generating great aberrations. As a result, the aberrations in the entire lens system cannot be corrected, or in order to avoid it, it is necessary to increase the number of lens elements.

In zoom lens systems like those of the above-described embodiments in which the second lens unit Gr2 comprises the front lens unit Gr2F having a positive optical power and the rear lens unit Gr2R having a positive optical power and the rear lens unit Gr2R is parallelly decentered to compensate for camera shake, it is preferable that the following condition (2) should be fulfilled:

$$0<\phi2F/\phi2R<1.0 \quad (2)$$

where $\phi2F$ represents the optical power of the front lens unit Gr2F of the second lens unit Gr2; and $\phi2R$ represents the optical power of the rear lens unit Gr2R of the second lens unit Gr2.

The condition (2) defines the ratio between the optical powers of the front lens unit Gr2F and the rear lens unit Gr2R of the second lens unit Gr2. The optical power of the rear lens unit Gr2R increases as the ratio approaches the lower limit of the condition (2), so that aberrations generated in the rear lens unit Gr2R increases. As a result, it is difficult to obtain excellent optical performance. When the upper limit of the condition (2) is exceeded, the optical power of the rear lens unit Gr2R is too low, so that the amount of movement of the rear lens unit Gr2R as the camera shake compensation unit is too great. For this reason, it is necessary to increase the lens diameter. As a result, compactness is lost.

It is further preferable that the following conditions (2a) and (2b) should be fulfilled:

$$0.2<\phi2F/\phi2R<1.0 \quad (2a)$$

$$0<\phi2F/\phi2R<0.6 \quad (2b)$$

The condition (2a) defines a range in which the lower limit of the condition (2) is limited to 0.2. By not exceeding the lower limit of the condition (2a), more excellent imaging performance is obtained. The condition (2b) defines a range in which the upper limit of the condition (2) is limited to 0.6. By not exceeding the upper limit of the condition (2b), a more compact optical system is obtained.

By reducing the number of lens elements included in the camera shake compensation unit, the load imposed on the camera shake compensation drive system is lightened. Therefore, by reducing the number of lens elements included in the rear lens unit Gr2R serving as the camera shake compensation unit, the load imposed on the camera shake compensation drive system is further lightened. It is particularly preferable that the rear lens unit Gr2R should include one lens element or one doublet lens element. This is because the load imposed on the camera shake compensation drive system is minimized by minimizing the number of lens elements included in the rear lens unit Gr2R.

Further, in zoom lens systems, like those of the above-described embodiments in which the first lens unit Gr2 comprises the front lens unit Gr1F, having a positive optical power, and the rear lens unit Gr1R, having a positive optical power, wherein the front lens unit Gr1F is parallely decentered to compensate for camera shake, it is preferable that the following condition should be fulfilled:

$$0<\phi2R/\phi2F<1.0$$

wherein $\phi2R$ represents the optical power of the rear lens unit and $\phi2F$ represents the optical power of the front lens unit.

If a lens is decentered when camera shake occurs, axial lateral chromatic aberration is generated. To curb this, it is preferable that the rear lens unit Gr2R serving as the camera shake compensation unit should be achromatic. In this regard, it is preferable that the rear lens unit Gr2R should fulfill the condition (3) shown below. By fulfilling the condition (3), the generation of the axial lateral chromatic aberration when camera shake occurs is curbed.

$$\nu p>\nu n \quad (3)$$

where $\nu p$ represents the Abbe number of the positive lens element in the rear lens unit Gr2R; and $\nu n$ represents the Abbe number of the negative lens element in the rear lens unit Gr2R.

When a lens unit is moved perpendicularly to the optical axis for camera shake compensation, in camera shake compensated state (post-decentering state), light passes through a portion where no light passes in normal state (pre-decentering state). There is a possibility that this light becomes harmful light to degrade imaging performance. For this reason, it is desired to intercept the harmful light in camera shake compensation by providing a stationary aperture diaphragm on the object side of the camera shake compensation unit, in the camera shake compensation unit or on the image side of the camera shake compensation unit. Thereby, excellent imaging performance is obtained in camera shake compensated state.

Hereinafter, the above-described first to fifth embodiments will be more concretely described with reference to construction data and graphic representations of aberrations. FIGS. 1, 2, 3, 13 and 14 showing the first to fifth embodiments show the lens arrangements of the first to fifth embodiments at the shortest focal length condition (W). Tables 1, 2, 3, 4 and 5 show the construction data of the first, second, third, fourth and fifth embodiments, respectively.

In the construction data of the embodiments, ri (i=1, 2, 3, ...) represents the radius of curvature of an ith surface counted from the object side and di (i=1, 2, 3, ...) represents an ith axial distance counted from the object side. The axial distances (variable distances) varied by zooming are axial distances at the shortest focal length condition (W), at the middle focal length condition (M) and at the longest focal length condition (T). Ni (i=1, 2, 3, ...) and vi (i=1, 2, 3, ...) represents the refractive index (Nd) and the Abbe number (vd) to the d-line of an ith lens element counted from the object side. The focal lengths f and the F numbers FNO of the entire lens system at the shortest focal length condition (W), at the middle focal length condition (M) and at the longest focal length condition (T) are also shown together with the construction data.

The first to third embodiments fulfill the above-described conditions (1) to (3). Table 6 shows corresponding values of the conditions (1), (1a), (1b), (2), (2a) and (2b) (that is, $\phi1/\phi2$ of the conditions (1), (1a) and (1b) and $\phi2R/\phi2F$ of the conditions (2), (2a) and (2b) in the embodiments.

FIGS. 4A to 4I, 5A to 5I, 6A to 6I, 15A to 15I and 16A to 16I are graphic representations of longitudinal aberrations corresponding to the first to fifth embodiments in normal state (pre-decentering state). In the figures, (W), (M) and (T) show aberrations (from the left, spherical aberration, etc., astigmatism and distortion; Y: image height) at the shortest focal length condition (FIGS. 4A to 4C, 5A to 5C, 6A to 6C, 15A to 15C and 16A to 16C), at the middle focal length condition (FIGS. 4D to 4F, 5D to 5F, 6D to 6F, 15D to 15F and 16D to 16F) and at the longest focal length condition (FIGS. 4G to 4I, 5G to 5I, 6G to 6I, 15G to 15I and 16G to 16I), respectively. In the figures, the solid line d represents aberration to the d-line and the broken line SC represents sine condition. The broken line DM and the solid line DS represent astigmatisms to the d-line on the meridional image plane and on the sagittal image plane, respectively.

FIGS. 7A to 7E, 8A to 8E, 9A to 9E, 10A to 10E, 11A to 11E, 12A to 12E, 17A to 17E, 18A to 18E, 19A to 19E and 20A to 20E are graphic representations of lateral aberrations of the first to fifth embodiments in infinity photographing state on the meridional image plane corresponding to the shortest focal length condition (W) and the longest focal length condition (T). Of these figures, FIGS. 7A to 7C, 8A to 8C, 9A to 9C, 10A to 10C, 11A to 11C, 12A to 12C, 17A to 17C, 18A to 18C, 19A to 19C 20A to 20C are graphic representations of lateral aberrations at an image height y' of y'=+12,0,−12 in 0.7-degree camera shake compensated state [compensated state with a camera shake compensation angle of the camera shake compensation unit of θ=0.7° (=0.0122173 rad)]. FIGS. 7D, 7E, 8D, 8E, 9D, 9E, 10D, 10E, 11D, 11E, 17D, 17E, 18D, 18E, 19D, 19E, 20D and 20E are graphic representations of lateral aberrations at an image height y' of y'=12,0 in normal state.

Figure 21:
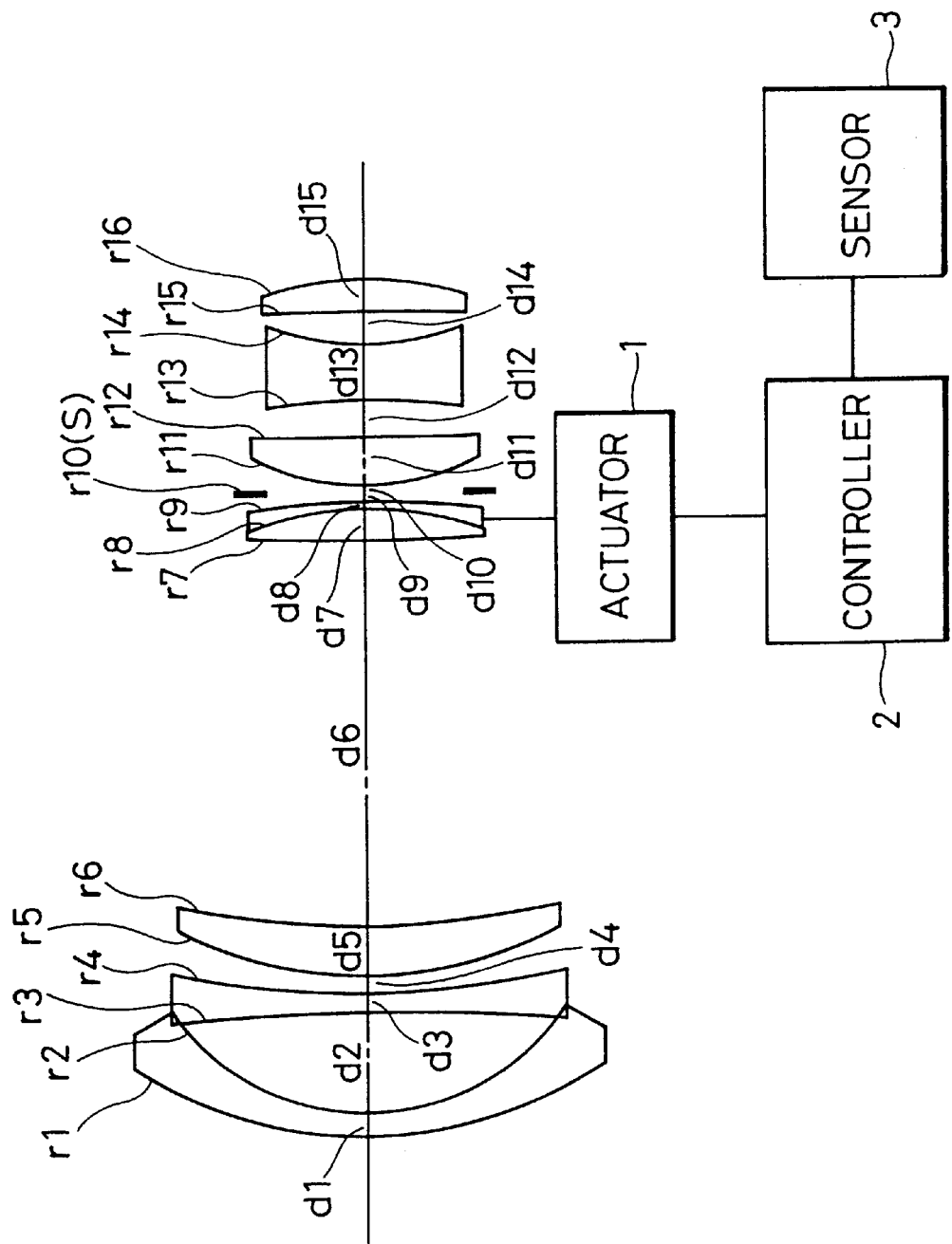
FIG. 21 is a block diagram of the zoom lens system according to the fourth to which is applied to a zoom lens device capable of camera shake compensation.

FIG. 21 is a block diagram showing an example in which the zoom lens system according to the fourth embodiment is applied to a zoom lens device capable of camera shake compensation. In the zoom lens system according to the fourth embodiment, the front lens unit of the second lens unit serving as the camera shake compensation unit is provided with an actuator 1 for moving the front lens unit in a direction perpendicular to the optical axis. The actuator 1 is disposed so as to drive the front lens unit in response to the driving signal. To the actuator 1, a controller 2 is connected, and to the controller 2, a sensor 3 is connected.

The sensor 3 is constructed so as to, when the entire optical system vibrates because of camera shake, output the detecting signal in response to the vibration. The detecting signal outputted from the sensor 3 is inputted to the controller 2. The controller 2 calculates (or retrieves from a known data table stored in the memory) the compensation movement amount of the front lens unit based oil the detecting signal and outputs the driving signal to the actuator 1 based on the movement amount. The actuator 1 moves the front lens unit in a direction perpendicular to the optical axis. Camera shake compensation is thus performed.

Figure 22:
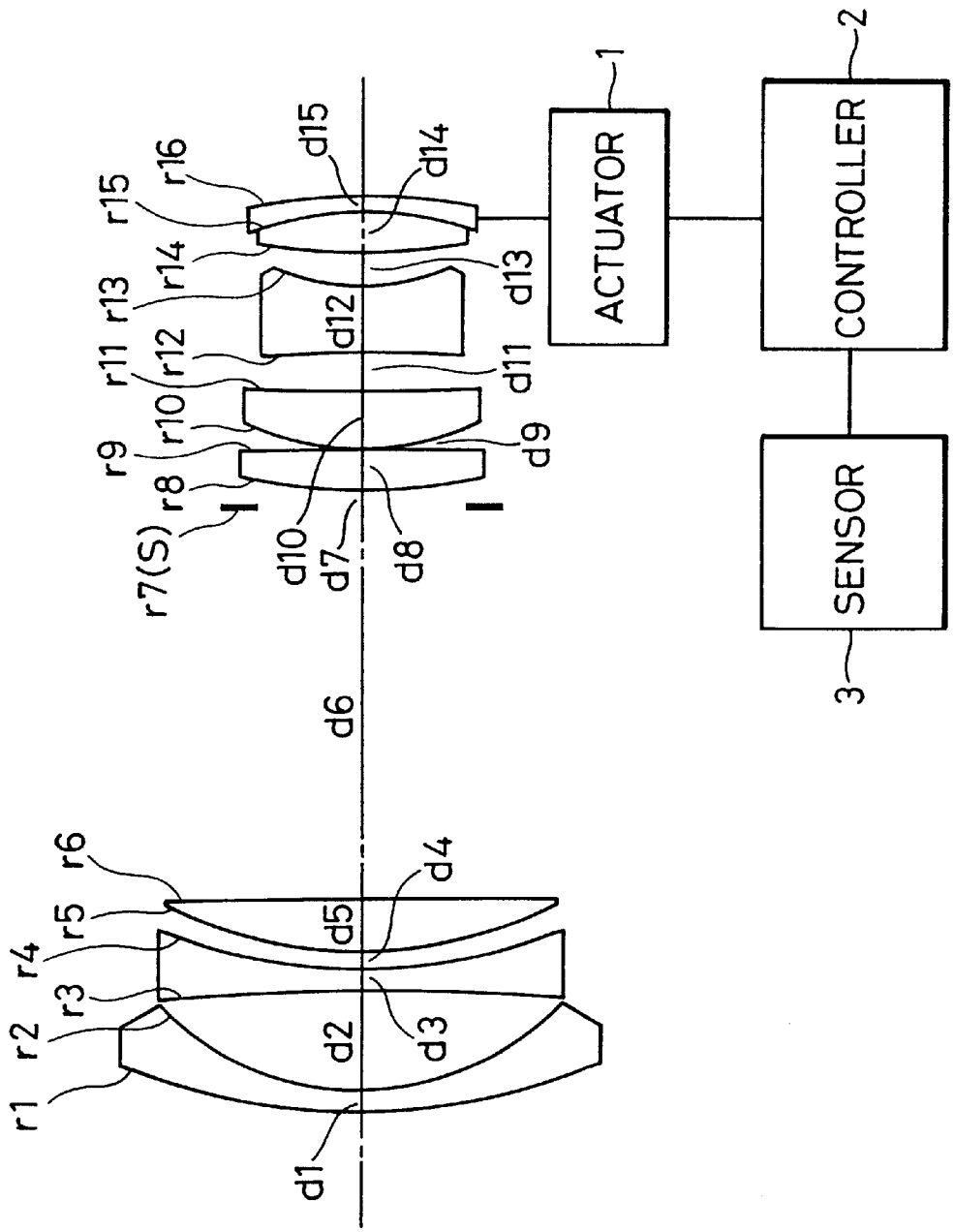
FIG. 22 is a block diagram of the zoom lens system according to the first embodiment to which is applied to a zoom lens device capable of camera shake compensation.

FIG. 22 is a block diagram showing an example in which the zoom lens system according to the first embodiment is applied to a zoom lens device capable of camera shake compensation. In the zoom lens system according to the first embodiment, the rear lens unit of the second lens unit serving as the camera shake compensation unit is provided with an actuator 1 for moving the rear lens unit in a direction perpendicular to the optical axis. The actuator 1 is disposed so as to drive the rear lens unit in response to the externally inputted driving signal. To the actuator 1, a controller 2 is connected and to the controller 2, a sensor 3 is connected.

The sensor 3 is constructed so as to, when the entire optical system vibrates because of camera shake, output the detecting signal in response to the vibration. The detecting signal outputted from the sensor 3 is inputted to the controller 2. The controller 2 calculates (or retrieves from a known data table) the compensation movement amount of the rear lens unit based on the detecting signal and outputs the driving signal to the actuator 1 based on the movement amount. The actuator 1 moves the rear lens unit in a direction perpendicular to the optical axis. Camera shake compensation is thus performed.

Obviously, many modifications and variations of the present invention are possible in light of the above teachings. It is therefore to be understood that within the scope of the appended claims, the invention may be practiced other than as specifically described.

TABLE 1

<< Embodiment 1 >>
f = 28.6~40.0~55.0
FNO = 4.10~4.90~5.80

| Radius of Curvature | Axial Distance | Refractive Index | Abbe Number |
|---|---|---|---|
| < First Lens Unit . . . Negative > | | | |
| r1 = 35.217 | | | |
| | d1 = 1.400 | N1 = 1.66446 | ν1 = 35.84 |
| r2 = 16.083 | | | |
| | d2 = 6.100 | | |
| r3 = −126.956 | | | |
| | d3 = 1.200 | N2 = 1.74400 | ν2 = 44.90 |
| r4 = 31.519 | | | |
| | d4 = 1.100 | | |
| r5 = 25.352 | | | |
| | d5 = 3.200 | N3 = 1.70055 | ν3 = 30.11 |
| r6 = 3113.422 | | | |
| | d6 = 24.105~10.386~1.000 | | |
| < Second Lens Unit Gr2 . . . Positive > | | | |
| {Front Lens Unit Gr2F . . . Positive} | | | |
| r7 = ∞ (Aperture diaphragm S) | | | |
| | d7 = 1.000 | | |
| r8 = 32.814 | | | |
| | d8 = 2.400 | N4 = 1.69680 | ν4 = 56.47 |
| r9 = 567.460 | | | |
| | d9 = 0.150 | | |
| r10 = 15.006 | | | |
| | d10 = 3.500 | N5 = 1.60311 | ν5 = 60.74 |
| r11 = 178.383 | | | |
| | d11 = 2.300 | | |
| r12 = −98.916 | | | |
| | d12 = 4.000 | N6 = 1.80750 | ν6 = 35.43 |
| r13 = 13.055 | | | |
| | d13 = 2.000 | | |
| {Rear Lens Unit (Camera Shake Compensation Unit) Gr2R . . . Positive} | | | |
| r14 = 36.512 | | | |
| | d14 = 2.500 | N7 = 1.60311 | ν7 = 60.74 |
| r15 = −20.000 | | | |
| | d15 = 1.000 | N8 = 1.63980 | ν8 = 34.55 |
| r16 = −31.144 | | | |

TABLE 2

<< Embodiment 2 >>
f = 28.8~39.6~54.4
FNO = 4.10~4.87~5.77

| Radius of Curvature | Axial Distance | Refractive Index | Abbe Number |
|---|---|---|---|
| < First Lens Unit . . . Negative > | | | |
| r1 = 41.130 | | | |
| | d1 = 1.400 | N1 = 1.67003 | ν1 = 47.15 |
| r2 = 16.413 | | | |
| | d2 = 6.100 | | |
| r3 = −73.898 | | | |
| | d3 = 1.200 | N2 = 1.74400 | ν2 = 44.90 |
| r4 = 85.672 | | | |
| | d4 = 1.100 | | |
| r5 = 31.391 | | | |
| | d5 = 3.200 | N3 = 1.70055 | ν3 = 30.11 |
| r6 = 222.790 | | | |
| | d6 = 24.105~11.188~1.818 | | |
| < Second Lens Unit Gr2 . . . Positive > | | | |
| {Front Lens Unit Gr2F . . . Positive} | | | |
| r7 = ∞ (Aperture diaphragm S) | | | |
| | d7 = 1.000 | | |
| r8 = 31.254 | | | |
| | d8 = 2.400 | N4 = 1.69680 | ν4 = 55.46 |

TABLE 2-continued

<< Embodiment 2 >>
f = 28.8~39.6~54.4
FNO = 4.10~4.87~5.77

| Radius of Curvature | Axial Distance | Refractive Index | Abbe Number |
|---|---|---|---|
| r9 = −111.963 | | | |
| | d9 = 0.150 | | |
| r10 = 14.627 | | | |
| | d10 = 3.500 | N5 = 1.62280 | ν5 = 56.91 |
| r11 = 25.607 | | | |
| | d11 = 2.300 | | |
| r12 = −843.462 | | | |
| | d12 = 4.000 | N6 = 1.80518 | ν6 = 25.43 |
| r13 = 13.604 | | | |
| | d13 = 2.000 | | |
| {Rear Lens Unit (Camera Shake Compensation Unit) Gr2R . . . Positive} | | | |
| r14 = 37.222 | | | |
| | d14 = 2.000 | N7 = 1.63980 | ν7 = 34.55 |
| r15 = −37.210 | | | |

TABLE 3

<< Embodiment 3 >>
f = 28.6~40.0~55.0
FNO = 4.10~4.87~5.77

| Radius of Curvature | Axial Distance | Refractive Index | Abbe Number |
|---|---|---|---|
| < First Lens Unit . . . Negative > | | | |
| r1 = 41.891 | | | |
| | d1 = 1.100 | N1 = 1.66998 | ν1 = 39.23 |
| r2 = 17.973 | | | |
| | d2 = 5.945 | | |
| r3 = −189.501 | | | |
| | d3 = 1.100 | N2 = 1.74400 | ν2 = 44.90 |
| r4 = 32.039 | | | |
| | d4 = 1.973 | | |
| r5 = 27.926 | | | |
| | d5 = 2.936 | N3 = 1.71736 | ν3 = 29.42 |
| r6 = 328.874 | | | |
| | d6 = 23.803~10.264~1.000 | | |
| < Second Lens Unit Gr2 . . . Positive > | | | |
| {Front Lens Unit Gr2F . . . Positive} | | | |
| r7 = ∞ (Aperture diaphragm S) | | | |
| | d7 = 0.100 | | |
| r8 = 31.338 | | | |
| | d8 = 1.805 | N4 = 1.69680 | ν4 = 56.47 |
| r9 = −312.039 | | | |
| | d9 = 0.101 | | |
| r10 = 14.569 | | | |
| | d10 = 3.438 | N5 = 1.60311 | ν5 = 60.74 |
| r11 = 40.719 | | | |
| | d11 = 0.371 | | |
| r12 = 375.140 | | | |
| | d12 = 6.000 | N6 = 1.80700 | ν6 = 39.79 |
| r13 = 12.883 | | | |
| | d13 = 1.112 | | |
| {Rear Lens Unit (Camera Shake Compensation Unit) Gr2R . . . Positive} | | | |
| r14 = 40.741 | | | |
| | d14 = 5.627 | N7 = 1.60311 | ν7 = 60.74 |
| r15 = −12.400 | | | |
| | d15 = 1.040 | N8 = 1.63980 | ν8 = 34.55 |
| r16 = −31.443 | | | |

TABLE 4

<< Embodiment 4 >>
f = 28.6~46.0~55.0
FNO = 4.10~5.20~5.78

| Radius of Curvature | Axial Distance | Refractive Index | Abbe Number |
|---|---|---|---|
| < First Lens Unit . . . Negative > | | | |
| r1 = 25.836 | | | |
| | d1 = 1.400 | N1 = 1.66608 | ν1 = 47.95 |
| r2 = 14.249 | | | |
| | d2 = 6.100 | | |
| r3 = −143.887 | | | |
| | d3 = 1.200 | N2 = 1.74400 | ν2 = 44.90 |
| r4 = 52.864 | | | |
| | d4 = 1.100 | | |
| r5 = 23.497 | | | |
| | d5 = 3.200 | N3 = 1.70055 | ν3 = 30.11 |
| r6 = 54.106 | | | |
| | d6 = 24.105~6.055~1.200 | | |
| < Second Lens Unit Gr2 . . . Positive > | | | |
| {Front Lens Unit (Camera Shake Compensation Unit) Gr2F . . . Positive} | | | |
| r7 = 119.215 | | | |
| | d7 = 2.000 | N4 = 1.69680 | ν4 = 55.46 |
| r8 = −20.000 | | | |
| | d8 = 0.500 | N5 = 1.70055 | ν5 = 30.11 |
| r9 = −49.816 | | | |
| | d9 = 0.500 | | |
| {Rear Lens Unit Gr2R . . . Positive} | | | |
| r10 = ∞ (Aperture diaphragm S) | | | |
| | d10 = 0.500 | | |
| r11 = 14.998 | | | |
| | d11 = 3.000 | N6 = 1.64769 | ν6 = 33.88 |
| r12 = 422.674 | | | |
| | d12 = 2.300 | | |
| r13 = −46.550 | | | |
| | d13 = 3.500 | N7 = 1.80518 | ν7 = 25.43 |
| r14 = 15.876 | | | |
| | d14 = 2.000 | | |
| r15 = −194.047 | | | |
| | d15 = 2.000 | N8 = 1.64769 | ν8 = 33.88 |
| r16 = −19.231 | | | |

TABLE 5

<< Embodiment 5 >>
f = 28.8~39.6~54.4
FNO = 4.10~4.87~5.77

| Radius of Curvature | Axial Distance | Refractive Index | Abbe Number |
|---|---|---|---|
| < First Lens Unit . . . Negative > | | | |
| r1 = 19.709 | | | |
| | d1 = 1.400 | N1 = 1.67003 | ν1 = 47.15 |
| r2 = 13.415 | | | |
| | d2 = 6.100 | | |
| r3 = −84.968 | | | |
| | d3 = 1.200 | N2 = 1.74400 | ν2 = 44.90 |
| r4 = 33.154 | | | |
| | d4 = 1.100 | | |
| r5 = 24.360 | | | |
| | d5 = 3.200 | N3 = 1.70055 | ν3 = 30.11 |
| r6 = 134.933 | | | |
| | d6 = 24.105~10.830~1.200 | | |
| < Aperture diaphragm S > | | | |
| r7 = ∞ | | | |
| | d7 = 1.000 | | |
| < Second Lens Unit Gr2 . . . Positive > | | | |
| {Front Lens Unit (Camera Shake Compensation Unit) Gr2F . . . Positive} | | | |

TABLE 5-continued

<< Embodiment 5 >>
f = 28.8~39.6~54.4
FNO = 4.10~4.87~5.77

| Radius of Curvature | Axial Distance | Refractive Index | Abbe Number |
|---|---|---|---|
| r8 = 81.954 | | | |
| | d8 = 2.400 | N4 = 1.69680 | ν4 = 55.46 |
| r9 = −41.665 | | | |
| | d9 = 0.150 | | |
| {Rear Lens Unit Gr2R . . . Positive} | | | |
| r10 = 16.125 | | | |
| | d10 = 3.500 | N5 = 1.62280 | ν5 = 56.91 |
| r11 = 65.080 | | | |
| | d11 = 2.300 | | |
| r12 = −49.981 | | | |
| | d12 = 4.000 | N6 = 1.80518 | ν6 = 25.43 |
| r13 = 18.527 | | | |
| | d13 = 2.000 | | |
| r14 = −109.252 | | | |
| | d14 = 2.000 | N7 = 1.63980 | ν7 = 34.55 |
| r15 = −17.978 | | | |

TABLE 6

| | Condition (1), (1a), or (1b) −1.0 < φ1/φ2 < −0.4 | | Condition (2), (2a), or (2b) 0 < φ2F/φ2R < 1.0 | |
|---|---|---|---|---|
| | (−0.8) | (−0.55) | (0.2) | (0.6) |
| Embodiment 1 | −0.02236/0.03248 = −0.69 | | 0.01329/0.03456 = 0.34 | |
| Embodiment 2 | −0.02239/0.03276 = −0.68 | | 0.01384/0.03402 = 0.41 | |
| Embodiment 3 | −0.02263/0.03253 = −0.70 | | 0.01428/0.03113 = 0.46 | |
| Embodiment 4 | −0.02191/0.03344 = −0.66 | | 0.0196/0.0131 = 1.496 | |
| Embodiment 5 | −0.02151/0.03319 = −0.65 | | 0.0250/0.0072 = 3.472 | |

What is claimed is:

1. A zoom lens system comprising, from an object side:
a first lens unit having a negative optical power, said first lens unit being provided at an object side end of said zoom lens system; and
a second lens unit having a positive optical power, said second lens unit being provided at an image side end of said zoom lens system and adjacent to said first lens unit, said second lens unit comprising, from the object side, a front lens unit having a positive optical power and a rear lens unit having a positive optical power,
wherein said front lens unit is capable of being shifted along a direction perpendicular to an optical axis of said zoom lens system, and
wherein the zoom lens system fulfills the following condition:

0<φ2R/φ2F<1.0
wherein:
φ2R represents an optical power of the rear lens unit; and
φ2F represents an optical power of the front lens unit.

2. A zoom lens system as claimed in claim 1, wherein said front lens unit comprises a positive lens element.

3. A zoom lens system as claimed in claim 1, wherein said front lens unit comprises a positive doublet lens element.

4. A zoom lens system as claimed in claim 1, wherein said zoom lens system fulfills the following condition:

−1.0<φ1/φ2<−0.4
where
φ1 represents an optical power of the first lens unit; and
φ2 represents an optical power of the second lens unit.

5. A zoom lens system as claimed in claim 1, wherein said zoom lens system fulfills the following condition:

0<φ2R/φ2F<1.0
where
φ2F represents an optical power of the front lens unit of the second lens unit; and
φ2R represents an optical power of the rear lens unit of the second lens unit.

6. A zoom lens system as claimed in claim 1, wherein said front lens unit has a positive lens element and a negative lens element:
wherein the zoom lens system fulfills the following condition:
νp>νn
where
νp represents Abbe number of the positive lens element; and
νn represents Abbe number of the negative lens element.

7. A zoom lens device comprising a zoom lens system, said zoom lens system comprising, from an object side:
a first lens unit having a negative optical power, said first lens unit being provided at an object side end of said zoom lens system; and
a second lens unit having a positive optical power, said second lens unit being provided at an image side end of said zoom lens system and adjacent to said first lens unit, said second lens unit comprising, from the object side, a front lens unit having a positive optical power and a rear lens unit having a positive optical power,
wherein said front lens unit is capable of being shifted along a direction perpendicular to an optical axis of said zoom lens system,
wherein a distance between said first lens unit and said second lens unit is varied during a zooming operation and a distance between said front lens unit and said rear lens unit is maintained during the zooming operation,
wherein the zoom lens system fulfills the following condition:

0<φ2R/φ2F<1.0
wherein:
φ2R represents an optical power of the rear lens unit; and
φ2F represents an optical power of the front lens unit, a detector which detects the vibration of the entire zoom lens system and outputs a detecting signal according to a result of the detection;
an actuator which moves said front lens unit in a direction perpendicular to the optical axis according to the driving signal input therein; and
a controller which outputs a driving signal to the actuator based on the detecting signal from the detector.

8. A zoom lens system comprising, from an object side:
a first lens unit having a negative optical powers, said first lens unit being provided at an object side end of said zoom lens system; and
a second lens unit having a positive optical power, said second lens unit being provided at an image side end of said zoom lens system and adjacent to said first lens unit, said second lens unit comprising, from the object side, a front lens unit having a positive optical power and a rear lens unit having a positive optical power, said second lens unit having an aperature diaphragm, wherein said rear lens unit is capable of being shifted along a direction perpendicular to an optical axis of said zoom lens system, wherein the zoom lens system fulfills the following condition:

$0<\phi 2F/\phi 2R<1.0$ wherein:

$\phi 2F$ represents an optical power of the front lens unit; and $\phi 2R$ represents an optical power of the rear lens unit.

9. A zoom lens system as claimed in claim 8, wherein said rear lens unit comprises a positive lens element.

10. A zoom lens system as claimed in claim 8, wherein said rear lens unit comprises a positive doublet lens element.

11. A zoom lens system as claimed in claim 8, wherein said zoom lens system fulfills the following condition:

$-1.0<\phi 1/\phi 2<-0.4$ where $\phi 1$ represents an optical power of the first lens unit; and $\phi 2$ represents an optical power of the second lens unit.

12. A zoom lens system as claimed in claim 8, wherein said zoom lens system fulfills the following condition:

$0<\phi 2R/\phi 2F<1.0$ where $\phi 2F$ represents an optical power of the front lens unit of the second lens unit; and $\phi 2R$ represents an optical power of the rear lens unit of the second lens unit.

13. A zoom lens system as claimed in claim 8, wherein said rear lens unit has a positive lens element and a negative lens element:

wherein the zoom lens system fulfills the following condition:

$\nu > \nu n$ where $\nu p$ represents Abbe number of the positive lens element; and $\nu n$ represents Abbe number of the negative lens element.

14. A zoom lens device comprising a zoom lens system, said zoom lens system comprising, from an object side:

a first lens unit having a negative optical power, said first lens unit being provided at an object side end of said zoom lens system; and a second lens unit having a positive optical power, said second lens unit being provided at an image side end of said zoom lens system and adjacent to said first lens unit, said second lens unit comprising, from the object side, a front lens unit having a positive optical power and a rear lens unit having a positive optical power, wherein said rear lens unit is capable of being shifted along a direction perpendicular to the optical axis of the zoom lens system, wherein a distance between said first lens unit and said second lens unit is varied during a zooming operation, and a distance between said front lens unit and said rear lens unit is maintained during the zooming operation, and wherein the zoom lens system fulfills the following condition:

$0.<\phi 2F/\phi 2R<1.0$ wherein:

$\phi 2F$ represents an optical power of the front lens unit; and $\phi 2R$ represents an optical power of the rear lens unit, a detector which detects the vibration of the entire zoom lens system and outputs a detecting signal according to a result of the detection;

an actuator which moves said rear lens unit in a direction perpendicular to the optical axis according to the driving signal input therein; and a controller which outputs a driving signal to the actuator based on the detecting signal from the detector.

* * * * *